US012726888B2

(12) United States Patent
Ko

(10) Patent No.: US 12,726,888 B2
(45) Date of Patent: Sep. 1, 2026

(54) ELECTRONIC DEVICE FOR SHARING FUNCTION AND OPERATING METHOD THEREFOR

(71) Applicant: SAMSUNG ELECTRONICS CO., LTD., Suwon-si (KR)

(72) Inventor: Hayoon Ko, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 308 days.

(21) Appl. No.: 18/368,345

(22) Filed: Sep. 14, 2023

(65) Prior Publication Data

US 2024/0007935 A1 Jan. 4, 2024

Related U.S. Application Data

(63) Continuation of application No. PCT/KR2022/001301, filed on Jan. 25, 2022.

(30) Foreign Application Priority Data

Mar. 22, 2021 (KR) ........................ 10-2021-0036465

(51) Int. Cl.
*H04W 48/16* (2009.01)
*H04W 8/18* (2009.01)
*H04W 48/02* (2009.01)

(52) U.S. Cl.
CPC ............. *H04W 48/16* (2013.01); *H04W 8/18* (2013.01); *H04W 48/02* (2013.01)

(58) Field of Classification Search
CPC ....... H04W 48/16; H04W 8/18; H04W 48/02; H04M 1/27453; H04M 1/72412;
(Continued)

(56) References Cited

U.S. PATENT DOCUMENTS 9,967,917 B1 5/2018 Seto et al.
10,419,051 B2 9/2019 Cho et al.
(Continued)

FOREIGN PATENT DOCUMENTS

JP 2018-186426 A 11/2018
JP 6727207 B2 7/2020
(Continued)

OTHER PUBLICATIONS

International Search Report (PCT/ISA/210) issued May 9, 2022 by the International Searching Authority in counterpart International Patent Application No. PCT/KR2022/001301.
(Continued)

*Primary Examiner* — Diane D Mizrahi
(74) *Attorney, Agent, or Firm* — Sughrue Mion, PLLC

(57) ABSTRACT

Provided is an electronic device that includes a communication circuit configured to perform communication via a cellular network. The electronic device is configured to be able to identify whether a call function using the cellular network is restricted, based on identifying that the call function using the cellular network is restricted, activate a function of sharing with an external electronic device, establish communication with a server, through the communication circuit, based on activating the function of sharing, and exchange at least one piece of data with the server, through the communication circuit, the at least one piece of data corresponding to the function of sharing with the external electronic device.

20 Claims, 16 Drawing Sheets

(58) Field of Classification Search
CPC ......... H04M 1/72463; H04M 2250/02; H04M 2201/34; H04M 2201/36; H04M 2201/38
See application file for complete search history.

(56) References Cited

U.S. PATENT DOCUMENTS

| | | | |
|---|---|---|---|
| 2001/0002191 | A1 | 5/2001 | Kim |
| 2009/0088162 | A1 | 4/2009 | Zhao et al. |
| 2010/0124897 | A1 | 5/2010 | Edge |
| 2011/0206003 | A1 | 8/2011 | Wu |
| 2011/0223902 | A1 | 9/2011 | Nasielski et al. |
| 2012/0122431 | A1 | 5/2012 | Moon |
| 2012/0172042 | A1 | 7/2012 | Drevon et al. |
| 2012/0224564 | A1 | 9/2012 | Paisal et al. |
| 2013/0063540 | A1 | 3/2013 | Zisimopoulos et al. |
| 2013/0324115 | A1 | 12/2013 | Hicks, III et al. |
| 2015/0271340 | A1 | 9/2015 | Yu et al. |
| 2016/0174273 | A1 | 6/2016 | Ginnela et al. |
| 2016/0345210 | A1 | 11/2016 | Shan et al. |
| 2017/0099386 | A1 | 4/2017 | Weber |
| 2017/0273119 | A1 | 9/2017 | Li et al. |
| 2017/0347278 | A1 | 11/2017 | Gonzalez et al. |
| 2019/0065711 | A1 * | 2/2019 | Seo ....................... G06F 9/4411 |
| 2020/0015134 | A1 | 1/2020 | Yang |
| 2020/0053521 | A1 | 2/2020 | Kim et al. |
| 2020/0395998 | A1 | 12/2020 | Yamamoto |
| 2022/0061126 | A1 | 2/2022 | Bae et al. |

FOREIGN PATENT DOCUMENTS

| | | | |
|---|---|---|---|
| JP | 2020-205508 | A | 12/2020 |
| KR | 10-1995-0035212 | A | 12/1995 |
| KR | 10-2001-0049002 | A | 6/2001 |
| KR | 10-2009-0032517 | A | 4/2009 |
| KR | 10-2010-0108584 | A | 10/2010 |
| KR | 10-2011-0089248 | A | 8/2011 |
| KR | 10-2011-0096498 | A | 8/2011 |
| KR | 10-2012-0024613 | A | 3/2012 |
| KR | 10-2012-0068928 | A | 6/2012 |
| KR | 10-2015-0051003 | A | 5/2015 |
| KR | 10-2015-0110263 | A | 10/2015 |
| KR | 10-2016-0011018 | A | 1/2016 |
| KR | 10-2016-0016577 | A | 2/2016 |
| KR | 10-2016-0106613 | A | 9/2016 |
| KR | 10-1752674 | B1 | 6/2017 |
| KR | 10-1781952 | B1 | 9/2017 |
| KR | 10-1783699 | B1 | 9/2017 |
| KR | 10-1937737 | B1 | 1/2019 |
| KR | 10-2019-0028816 | A | 3/2019 |
| KR | 10-2019-0131507 | A | 11/2019 |
| KR | 10-2020-0015055 | A | 2/2020 |
| KR | 10-2020-0017307 | A | 2/2020 |
| KR | 10-2020-0033404 | A | 3/2020 |
| KR | 10-2119586 | B1 | 6/2020 |

OTHER PUBLICATIONS

Written Opinion (PCT/ISA/237) issued May 9, 2022 by the International Searching Authority in counterpart International Patent Application No. PCT/KR2022/001301.

* cited by examiner

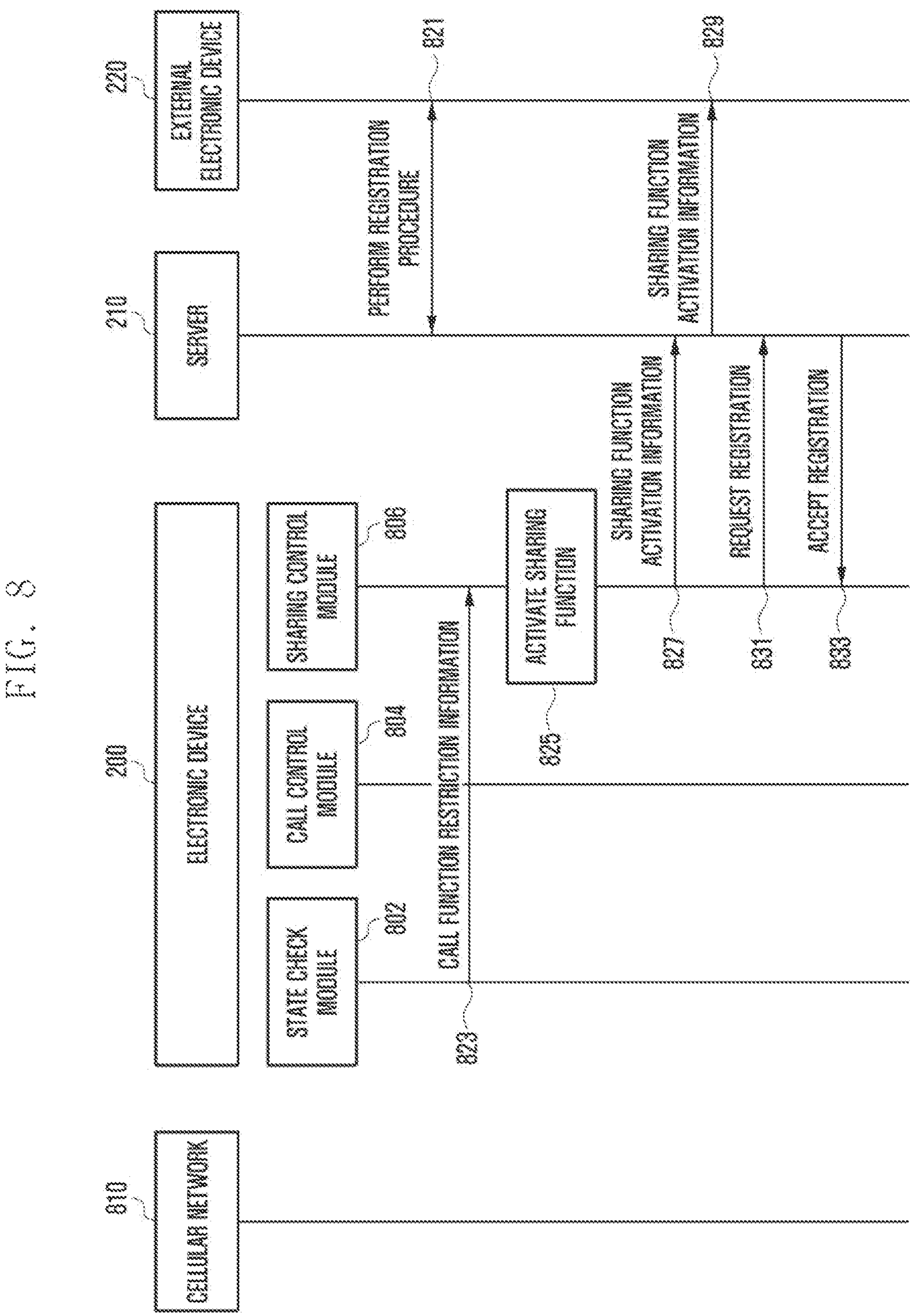
FIG. 8
810
CELLULAR NETWORK
200
ELECTRONIC DEVICE
STATE CHECK MODULE
802
CALL CONTROL MODULE
804
SHARING CONTROL MODULE
806
210
SERVER
220
EXTERNAL ELECTRONIC DEVICE
PERFORM REGISTRATION PROCEDURE
821
CALL FUNCTION RESTRICTION INFORMATION
823
ACTIVATE SHARING FUNCTION
825
SHARING FUNCTION ACTIVATION INFORMATION
827
SHARING FUNCTION ACTIVATION INFORMATION
829
REQUEST REGISTRATION
831
ACCEPT REGISTRATION
833

810
CELLULAR NETWORK
200
ELECTRONIC DEVICE
210
SERVER
220
EXTERNAL ELECTRONIC DEVICE
STATE CHECK MODULE
802
CALL CONTROL MODULE
804
SHARING CONTROL MODULE
806
ESTABLISH COMMUNICATION CHANNEL FOR FUNCTION SHARING
921
EMERGENCY CALL OCCURS
923
EMERGENCY CALL OCCURS
925

FIG. 10

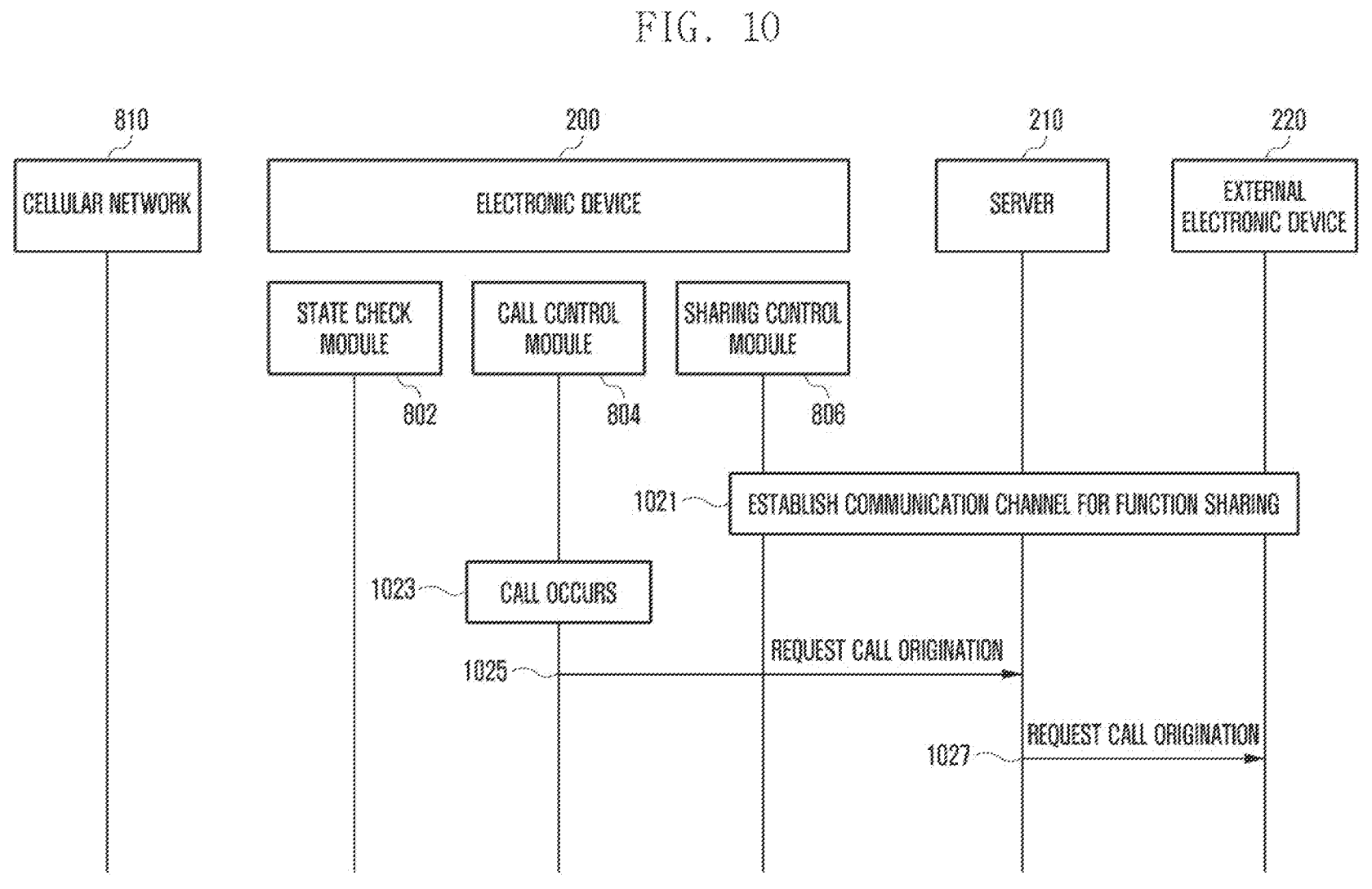

220 EXTERNAL ELECTRONIC DEVICE
210 SERVER
200 ELECTRONIC DEVICE
806 SHARING CONTROL MODULE
804 CALL CONTROL MODULE
802 STATE CHECK MODULE
810 CELLULAR NETWORK
1021 ESTABLISH COMMUNICATION CHANNEL FOR FUNCTION SHARING
1023 CALL OCCURS
1025 REQUEST CALL ORIGINATION
1027 REQUEST CALL ORIGINATION

FIG. 11

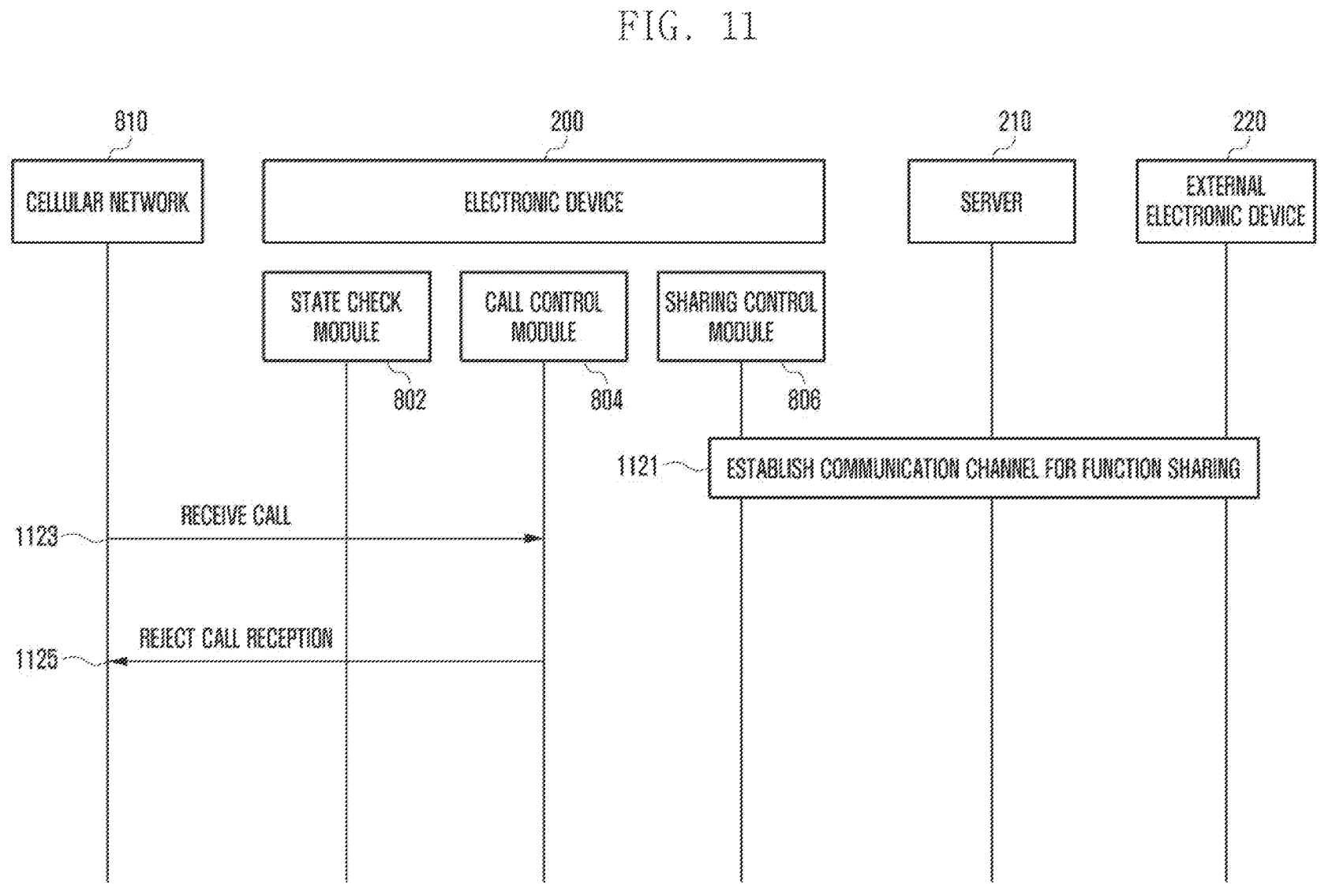

810 CELLULAR NETWORK

200 ELECTRONIC DEVICE

802 STATE CHECK MODULE

804 CALL CONTROL MODULE

806 SHARING CONTROL MODULE

210 SERVER

220 EXTERNAL ELECTRONIC DEVICE

1121 ESTABLISH COMMUNICATION CHANNEL FOR FUNCTION SHARING

1123 RECEIVE CALL

1125 REJECT CALL RECEPTION

FIG. 12

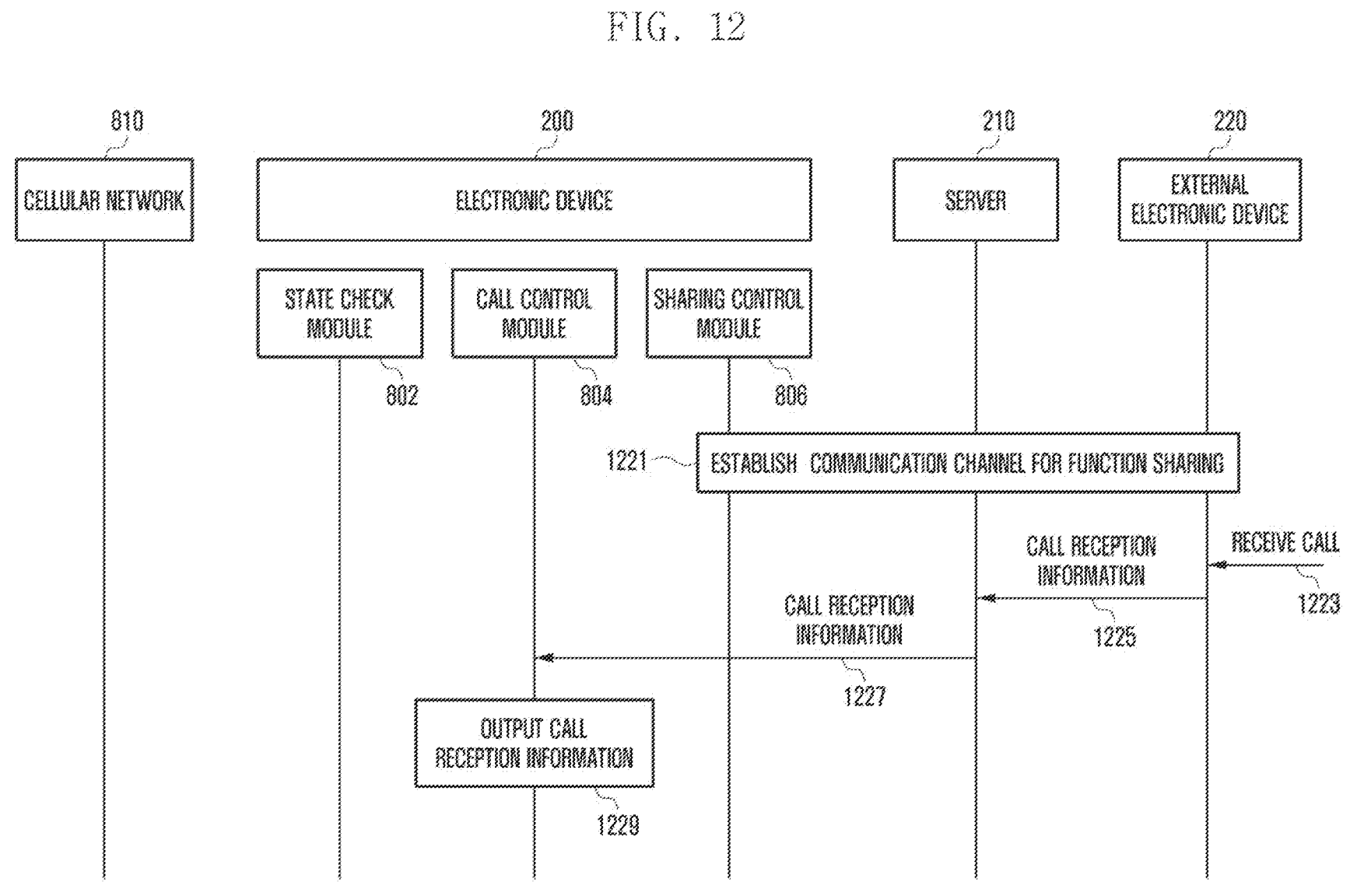

810 CELLULAR NETWORK

200 ELECTRONIC DEVICE

802 STATE CHECK MODULE

804 CALL CONTROL MODULE

806 SHARING CONTROL MODULE

210 SERVER

220 EXTERNAL ELECTRONIC DEVICE

1221 ESTABLISH COMMUNICATION CHANNEL FOR FUNCTION SHARING

1223 RECEIVE CALL

1225 CALL RECEPTION INFORMATION

1227 CALL RECEPTION INFORMATION

1229 OUTPUT CALL RECEPTION INFORMATION

ELECTRONIC DEVICE FOR SHARING FUNCTION AND OPERATING METHOD THEREFOR

CROSS-REFERENCE TO RELATED APPLICATION(S)

This application is a bypass continuation of PCT International Application No. PCT/KR2022/001301, which was filed on Jan. 25, 2022, and claims priority to Korean Patent Application No. 10-2021-0036465, filed on Mar. 22, 2021, in the Korean Intellectual Property Office, the disclosures of which are incorporated herein by reference in their entireties.

BACKGROUND

1. Field

The disclosure relates to an electronic device and a method for sharing at least one function in the electronic device with an external electronic device.

2. Description of Related Art

With the development of information and communication technology and semiconductor technology, various types of electronic devices are developing into multimedia devices providing a diversity of multimedia functions. For example, the multimedia functions may include at least one of a call function, a message function, a broadcast function, a wireless Internet function, a camera function, an electronic payment function, or a music playback function. Electronic devices may be configured in various forms, such as a smartphone, a tablet personal computer (PC), and a wearable device, to meet various needs of users. Accordingly, a growing number of users use various types of electronic devices.

An electronic device may share various contents (e.g., images and/or videos) with an external electronic device for convenience of a user using a plurality of electronic devices. For example, the electronic device may share screen information displayed on a display of the electronic device with the external electronic device.

When electronic devices supporting a cellular network share a call function related to one phone number, one call related to the phone number may be applied to each of the electronic devices sharing the call function. For example, when a call applied to a first electronic device among the electronic devices sharing the call function related to one phone number is terminated, a call applied to a second electronic device is also terminated, and thus a call may not be received through the electronic devices. For example, due to a difference between a time when the call is applied to the first electronic device and a time when the call is applied to the second electronic device, a ghost call may occur in which a call rejected by the first electronic device is temporarily received by the second electronic device.

Electronic devices (e.g., the first electronic device and the second electronic device) require a method for sharing (or linking) not only content but also various functions, such as a call function and a message function.

SUMMARY

Provided is an electronic device and a method for sharing (or linking) at least one function in the electronic device with an external electronic device. For example, the electronic device may selectively share at least one function (e.g., a call function and/or a message function) related to user identification information (e.g., a phone number) with an external electronic device, based on whether a call function is provided or whether registration with a network is possible, thereby improving convenience of a user using a plurality of electronic devices.

According to an aspect of the disclosure, an electronic device includes: a communication circuit configured to perform communication via a cellular network; a memory storing at least one instruction; and at least one processor operatively connected to the communication circuit and the memory. The at least one processor is configured to execute the at least one instruction to: identify whether a call function using the cellular network is restricted, based on identifying that the call function using the cellular network is restricted, activate a function of sharing with an external electronic device, establish communication with a server, through the communication circuit, based on activating the function of sharing, and exchange at least one piece of data with the server, through the communication circuit, the at least one piece of data corresponding to the function of sharing with the external electronic device.

The at least one processor may be further configured to execute the at least one instruction to: identify function configuration information about the electronic device stored in the memory; and determine that the call function using the cellular network is restricted, based on the function configuration information about the electronic device indicating that the electronic device is configured as a data-centric device.

The at least one processor may be further configured to execute the at least one instruction to: determine that the call function using the cellular network is restricted because a subscriber identity module is not inserted into the electronic device.

The at least one processor may be further configured to execute the at least one instruction to: determine that the call function using the cellular network is restricted because a profile of a subscriber identity module included in the electronic device is deactivated.

The at least one processor may be further configured to execute the at least one instruction to: transmit a registration request signal to a first network through the communication circuit; identify a registration rejection cause based on receiving a registration rejection signal from the first network; and determine, based on the registration rejection cause, that the call function using the cellular network is restricted.

The at least one processor may be further configured to execute the at least one instruction to: transmit information related to origination of a call to the server, through the communication circuit, based on receiving an input related to the origination of the call while the function of sharing is activated.

The electronic device may further include a display, and the at least one processor may be further configured to execute the at least one instruction to: control the display to display information related to reception of a call based on receiving the information related to the reception of the call from the server, through the communication circuit, while the function of sharing is activated.

The at least one processor may be further configured to execute the at least one instruction to: control the communication circuit to restrict at least one of origination or reception of a call using the cellular network, based on the function of sharing being activated.

The at least one processor may be further configured to execute the at least one instruction to: control the communication circuit to originate an emergency call through the cellular network based on receiving an input related to origination of the emergency call while the function of sharing is activated.

According to an aspect of the disclosure, an operating method of an electronic device includes: based on a communication circuit configured to perform communication via a cellular network being included in the electronic device, identifying whether a call function using the cellular network is restricted; based on identifying that the call function using the cellular network is restricted, activating a function of sharing with an external electronic device; establishing communication with a server, based on activating the function of sharing; and exchanging at least one piece of data with the server, the at least one piece of data corresponding to the function of sharing with the external electronic device.

The identifying whether the call function using the cellular network is restricted may include: determining that the call function using the cellular network is restricted because the electronic device is configured as a data-centric device, based on function configuration information about the electronic device stored in a memory of the electronic device, because a subscriber identity module is not inserted into the electronic device, or because a profile of a subscriber identity module included in the electronic device is deactivated.

The identifying whether the call function using the cellular network is restricted may include: transmitting a registration request signal to a first network; identifying a registration rejection cause based on receiving a registration rejection signal from the first network; and identifying, based on the registration rejection cause, that the call function using the cellular network is restricted.

The exchanging the at least one piece of data with the server may include: transmitting at least one of information related to origination of a call or information related to transmission of a message, based on receiving an input related to at least one of the origination of the call or the transmission of the message while the function of sharing is activated.

The exchanging the at least one piece of data with the server may include: outputting at least one of information related to reception of a call or information related to reception of a message based on receiving the information related to at least one of the reception of the call or the reception of the message from the server while the function of sharing is activated.

The method may further include: restricting at least one of origination or reception of a call using the cellular network based on the function of sharing being activated.

The method may further include: originating an emergency call through the cellular network based on receiving an input related to origination of the emergency call while the function of sharing is activated.

According to an aspect of the disclosure, a non-transitory computer readable medium stores computer readable program code or instructions which are executable by a processor to perform a method of an electronic device. The method includes: based on a communication circuit configured to perform communication via a cellular network being included in the electronic device, identifying whether a call function using the cellular network is restricted; based on identifying that the call function using the cellular network is restricted, activating a function of sharing with an external electronic device; establishing communication with a server, based on activating the function of sharing; and exchanging at least one piece of data with the server, the at least one piece of data corresponding to the function of sharing with the external electronic device.

The method of the identifying whether the call function using the cellular network is restricted may include: transmitting a registration request signal to a first network; identifying a registration rejection cause based on receiving a registration rejection signal from the first network; and identifying, based on the registration rejection cause, that the call function using the cellular network is restricted.

The method of the exchanging the at least one piece of data with the server may include: transmitting at least one of information related to origination of a call or information related to transmission of a message, based on receiving an input related to at least one of the origination of the call or the transmission of the message while the function of sharing is activated.

The method of the exchanging the at least one piece of data with the server may include: outputting at least one of information related to reception of a call or information related to reception of a message based on receiving the information related to at least one of the reception of the call or the reception of the message from the server while the function of sharing is activated.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 illustrates an example in which an electronic device shares at least one function with an external electronic device according to an embodiment;

FIG. 10 illustrates an example in which an electronic device shares a call function with an external electronic device according to an embodiment;

FIG. 11 illustrates an example in which an electronic device rejects call reception according to an embodiment;

FIG. 12 illustrates another example in which an electronic device shares a call function with an external electronic device according to an embodiment;

DETAILED DESCRIPTION

Figure 1:
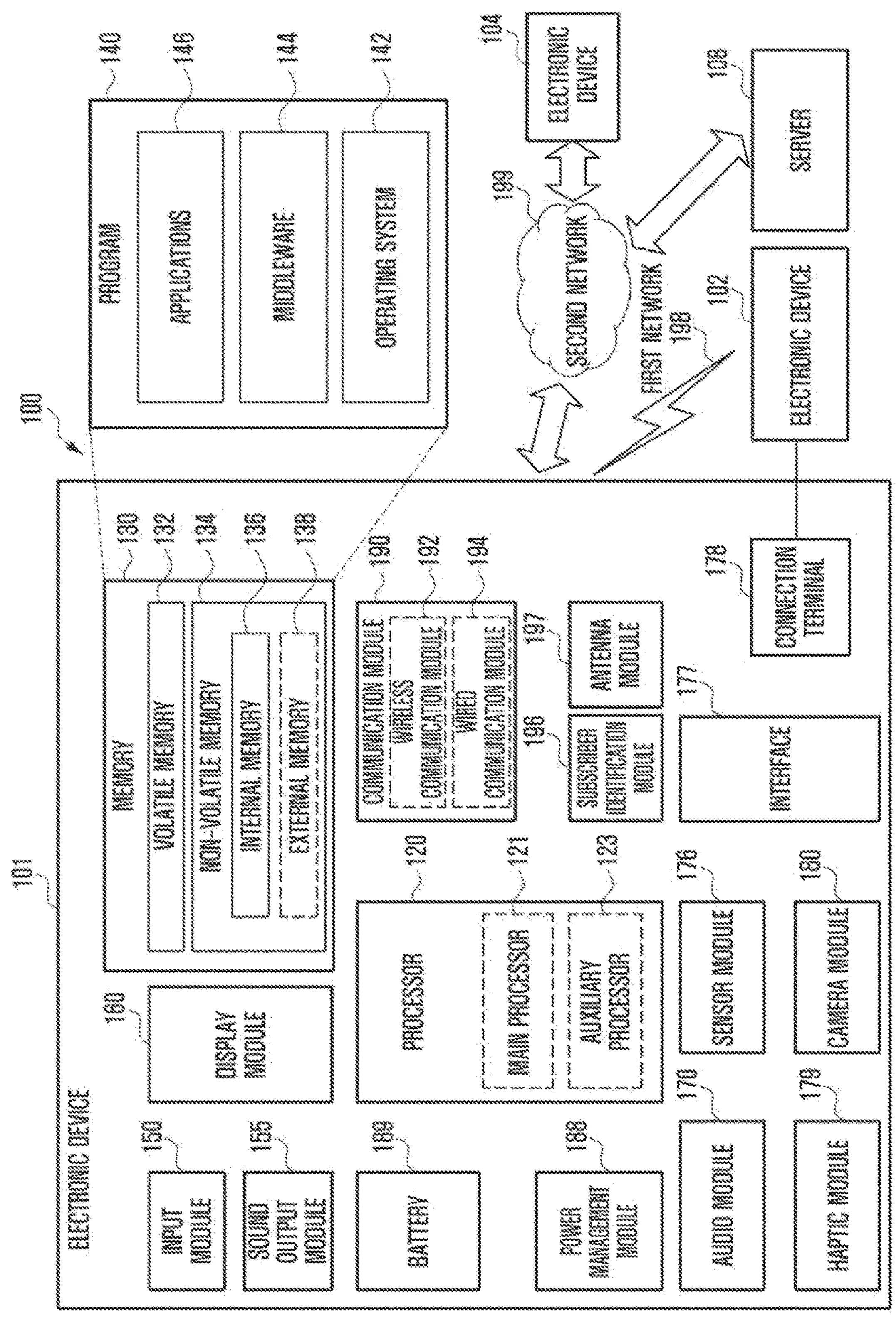
FIG. 1 is a block diagram of an electronic device in a network environment according to an embodiment.

Hereinafter, embodiments of the present disclosure will be described in detail with reference to the accompanying drawings, where similar reference characters denote corresponding features consistently throughout.

Embodiments of the disclosure disclosed in the specification and drawings are only intended to provide specific examples for easily describing the technical content according to the embodiments of the disclosure and for assisting understanding of the embodiments of the disclosure, and are not intended to limit the scope of the embodiments of the disclosure. Therefore, it should be interpreted that the scope of various embodiments of the disclosure includes all changes or modifications derived based on the technical idea of various embodiments of the disclosure in addition to the embodiments disclosed herein.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
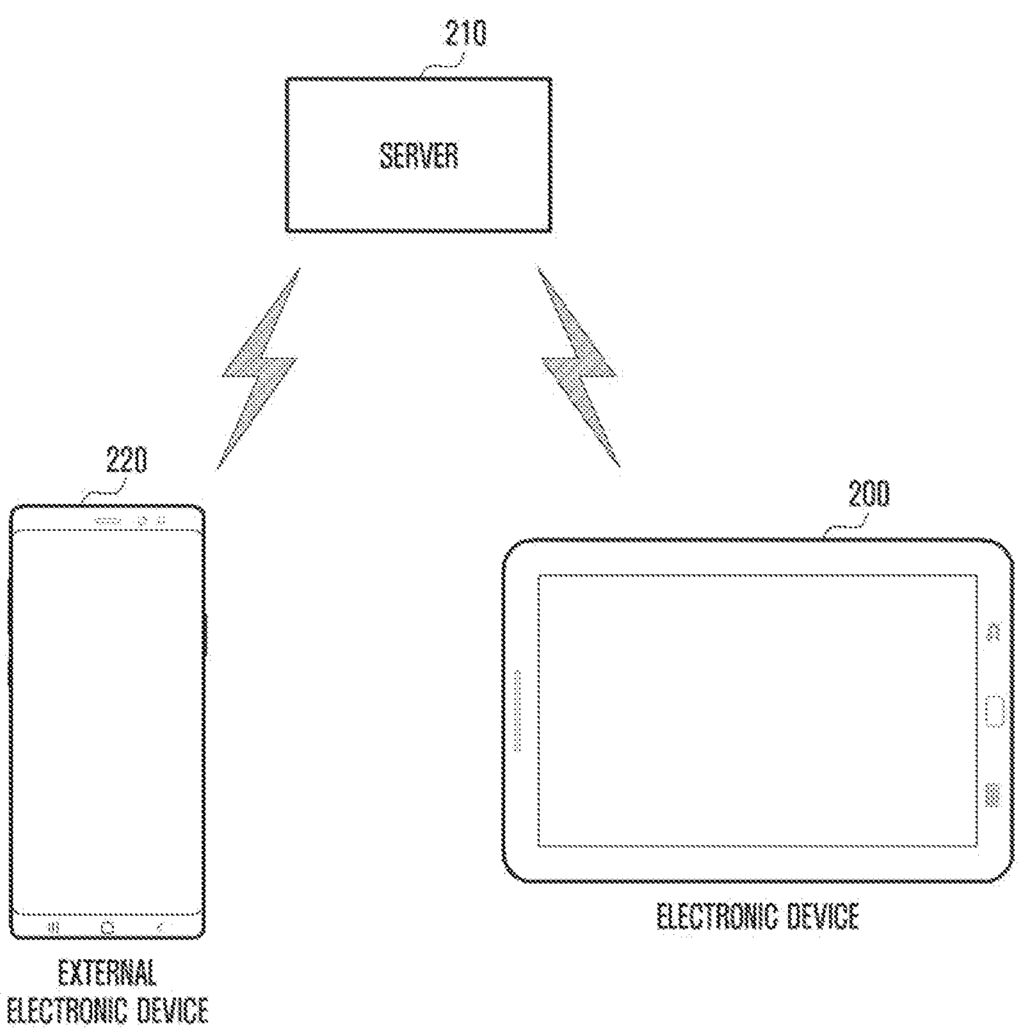
FIG. 2 illustrates an example of a plurality of electronic devices for sharing at least one function according to an embodiment.

FIG. 2 illustrates an example of a plurality of electronic devices for sharing at least one function according to an embodiment. According to an embodiment, an electronic device 200 and/or an external electronic device 220 of FIG. 2 may be at least partly similar to the electronic device 101 of FIG. 1, or may further include other embodiments of an electronic device.

Referring to FIG. 2, according to an embodiment, the electronic device 200 may selectively activate a sharing function (or sharing menu) of sharing at least one function (e.g., a call function and/or a message function) with the external electronic device 220. According to an embodiment, the electronic device 200 may selectively activate the sharing function (or sharing menu) of the electronic device 200, based on whether the electronic device 200 is able to provide a call function using a cellular network. For example, the sharing function of the electronic device 200 may be activated when the electronic device 200 is unable to provide the call function using the cellular network. In another example, the sharing function of the electronic device 200 may be deactivated when the electronic device 200 is able to provide the call function using the cellular network. For example, a state in which the electronic device 200 is unable to provide the call function using the cellular network may include a state in which the electronic device 200 does not support the call function, a state in which the electronic device 200 is configured as a data-centric device, or a state in which registration with the cellular network is restricted. For example, the cellular network may include at least one of a 2G network, a 3G network, a 4G network (e.g., a long-term evolution (LTE) network), or a 5G network (e.g., a new radio (NR) network).

According to an embodiment, the electronic device 200 may selectively activate the sharing function (or sharing menu) of the electronic device 200, based on whether the registration with the cellular network is restricted. For example, the sharing function of the electronic device 200 may be activated when the electronic device 200 is restricted from being registered with the cellular network. For example, the sharing function of the electronic device 200 may be deactivated when the registration of the electronic device 200 with the cellular network is possible. For example, the state in which the registration with the cellular network is restricted may include a state in which a profile of an embedded subscriber identity module (eSIM) is deactivated or a state in which a subscriber identity module (or subscriber identity card) is not inserted. For example, the state in which the registration with the cellular network is restricted may be determined based on a registration rejection cause included in a registration rejection message received from the cellular network.

According to an embodiment, when the sharing function of the electronic device 200 is activated, the electronic device 200 may be registered with a server 210 to share a function with the external electronic device 220. For example, the electronic device 200 may transmit information related to activation of function sharing of the electronic device 200 to the server 210 through a wireless network. The server 210 may transmit the information related to the activation of function sharing of the electronic device 200 to the external electronic device 220. For example, the electronic device 200 may transmit a registration request message including information related to a user account of the electronic device 200 to the server 210 through the wireless network. The server 210 may accept registration of the electronic device 200 when user authentication based on the information related to the user account included in the registration request message succeeds. The electronic device 200 may determine that the electronic device 200 is registered with the server 210, based on information related to registration acceptance received from the server 210. For example, when the sharing function of the electronic device 200 is activated, the electronic device 200 may be restricted from originating and/or receiving a call through the cellular network. For example, when the sharing function of the electronic device 200 is activated, the electronic device 200 may be restricted from transmitting and/or receiving a message through the cellular network. For example, the wireless network may include the cellular network and/or a wireless LAN network.

According to an embodiment, when the sharing function of the electronic device 200 is deactivated, the electronic device 200 may cancel registration with the server 210. For example, the electronic device 200 may transmit information related to deactivation of function sharing of the electronic device 200 to the server 210 through the wireless network. The server 210 may transmit the information related to the deactivation of function sharing of the electronic device 200 to the external electronic device 220. For example, the electronic device 200 may transmit a deregistration signal to the server 210. The electronic device 200 may determine that the registration with the server 210 is canceled, based on information related to deregistration acceptance received from the server 210 in response to the deregistration signal. For example, when the sharing function of the electronic device 200 is deactivated, the electronic device 200 may originate and/or receive a call through the cellular network. For example, when the sharing function of the electronic device 200 is deactivated, the electronic device 200 may transmit and/or receive a message through the cellular network.

According to an embodiment, the external electronic device 220 may be registered with the server 210 to share at least one function (e.g., a call function and/or a message function) with the electronic device 200. According to an embodiment, when a sharing function (or sharing menu) is activated based on a user input, the external electronic device 220 may transmit a registration request message including information related to a user account of the external electronic device 220 to the server 210 through the wireless network. The server 210 may accept registration of the external electronic device 210 when user authentication based on the information related to the user account included in the registration request message succeeds. The external electronic device 220 may determine that the external electronic device 220 is registered with the server 210, based on information related to registration acceptance received from the server 210.

According to an embodiment, when the sharing functions are activated, the electronic device 200 and the external electronic device 220 may share at least one function (e.g., a call function and/or a message function) through the server 210. According to an embodiment, when receiving a message through the cellular network, the external electronic device 220 may transmit information related to reception of the message to the electronic device 200 through the server 210. The electronic device 200 may externally output message reception information, based on the information related to the reception of the message. According to an embodiment, when transmitting a message, the electronic device 200 may transmit information related to transmission of the message (e.g., content of the message and/or information related to a destination) to the external electronic device 220 through the server 210. The external electronic device 220 may transmit a message through the cellular network, based on the information related to the transmission of the message.

According to an embodiment, when receiving a call through the cellular network, the external electronic device 220 may transmit information related to reception of the call to the electronic device 200 through the server 210. The electronic device 200 may externally output call reception information, based on the information related to the reception of the call received from the external electronic device 220 through the server 210. According to an embodiment, when originating a call, the electronic device 200 may transmit information related to origination of the call (e.g., information related to a destination) to the external electronic device 220 through the server 210. The external electronic device 220 may attempt to connect a call to a destination terminal through the cellular network, based on the information related to the origination of the call. According to an embodiment, when the call to the destination terminal is connected through the external electronic device 220, the electronic device 200 may perform the call function with the destination terminal through the server 210 and the external electronic device 220.

According to an embodiment, when the user account of the electronic device 200 and the user account of the external electronic device 220 are the same, the server 210 may determine that the electronic device 200 and the external electronic device 220 share at least one function. According to an embodiment, when the user account of the electronic device 200 and the user account of the external electronic device 220 registered in the server 210 are the same, the server 210 may determine that the electronic device 200 and the external electronic device 220 share at least one function. According to an embodiment, when determining that the electronic device 200 and the external electronic device 220 share the at least one function, the server 210 may transmit and/or receive information related to function sharing to and/or from the electronic device 200 and/or the external electronic device 220. For example, the server 210 may transmit information related to reception of a message received from the external electronic device 220 to the electronic device 200. For example, the server 210 may transmit information related to transmission of a message (e.g., content of the message and/or information related to a destination) received from the electronic device 200 to the external electronic device 220. For example, the server 210 may transmit information related to reception of a call received from the external electronic device 220 to the electronic device 200. For example, the server 210 may transmit information related to origination of a call (e.g., information related to a destination) received from the electronic device 200 to the external electronic device 220.

According to an embodiment, when the call function is activated, the electronic device 200 may provide the call function using the same phone number as that of the external electronic device 220.

According to an embodiment, the electronic device 200 and the external electronic device 220 may directly transmit and/or receive information related to sharing of the at least one function. According to an embodiment, the electronic device 200 may directly transmit and/or receive the information related to sharing of the at least one function from and/to the external electronic device 220 without going through the server 210.

Figure 3:
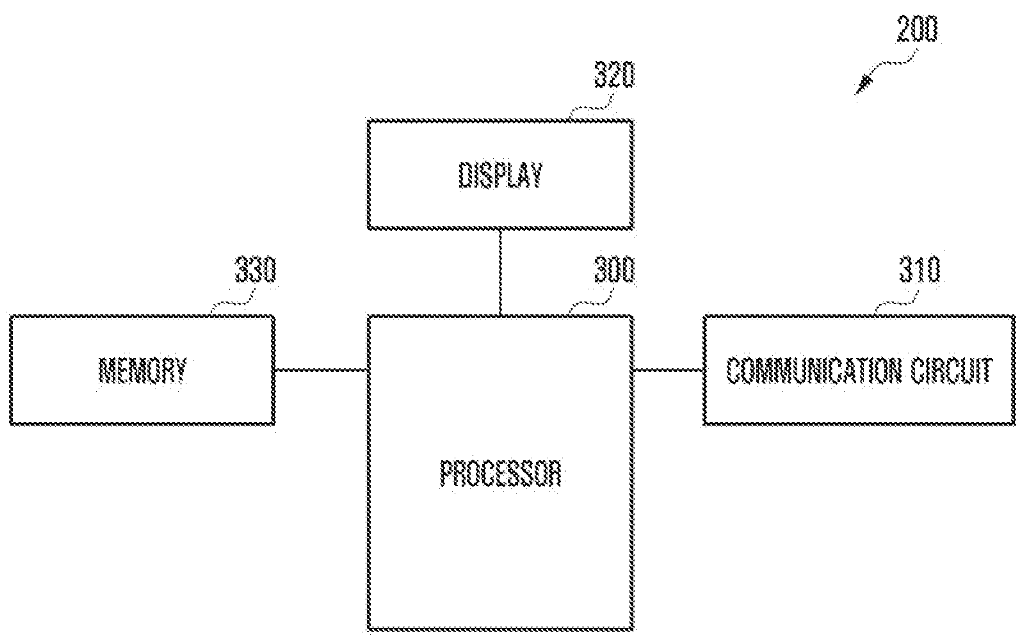
FIG. 3 is a block diagram of an electronic device for sharing at least one function according to an embodiment.

FIG. 3 is a block diagram of an electronic device for sharing at least one function according to an embodiment. According to an embodiment, the electronic device 200 of FIG. 3 may be at least partly similar to the electronic device 101 of FIG. 1 or the electronic device 200 of FIG. 2, or may further include other embodiments of an electronic device.

Referring to FIG. 3, according to an embodiment, the electronic device 200 may include a processor 300, a communication circuit 310, a display 320, and/or a memory 330. According to an embodiment, the processor 300 may be substantially the same as the processor 120 of FIG. 1, or may be included in the processor 120. The communication circuit 310 may be substantially the same as the wireless communication module 192 of FIG. 1, or may be included in the wireless communication module 192. The display 320 may be substantially the same as the display module 160 of FIG. 1, or may be included in the display module 160. The memory 330 may be substantially the same as the memory 130 of FIG. 1, or may be included in the memory 130.

According to an embodiment, the processor 300 may control the communication circuit 310, the display 320, and/or the memory 330 which are operatively connected thereto. According to an embodiment, the processor 300 may include an application processor (AP) (e.g., the main processor 121 of FIG. 1) and/or a communication processor (CP) (e.g., the coprocessor 123 of FIG. 1 or the communication module 190 of FIG. 1).

According to an embodiment, the processor 300 may selectively activate a sharing function (or sharing menu) of sharing at least one function (e.g., a call function and/or a message function) with an external electronic device 220. According to an embodiment, when the call function is not available through the communication circuit 310, the processor 300 may activate the sharing function of the electronic device 200. For example, the processor 300 may determine that the call function is not available through the communication circuit 310 when the electronic device 200 does not support the call function or the electronic device 200 is configured as a data-centric device, based on function configuration information about the electronic device 200 stored in the memory 330. For example, when registration with a cellular network through the communication circuit 310 is restricted, the processor 300 may determine that the call function is not available through the communication circuit 310. For example, the cellular network may include at least one of a 2G network, a 3G network, a 4G network (e.g., an LTE network), or a 5G network (e.g., an NR network).

According to an embodiment, when the call function is available through the communication circuit 310, the processor 300 may deactivate the sharing function of the electronic device 200. For example, the processor 300 may determine that the call function is available through the communication circuit 310 when the electronic device 200 supports the call function or the electronic device 200 is not configured as the data-centric device, based on the function configuration information about the electronic device 200 stored in the memory 330. For example, when the registration with the cellular network through the communication circuit 310 is possible, the processor 300 may determine that the call function is available through the communication circuit 310.

According to an embodiment, when the registration with the cellular network is restricted, the processor 300 may activate the sharing function (or sharing menu) of the electronic device 200. For example, when a profile of an embedded subscriber identity module (eSIM) of the electronic device 200 is deactivated, the processor 300 may determine that the registration with the cellular network is restricted. For example, when a subscriber identity module (or subscriber identity card) is not inserted into the electronic device 200, the processor 300 may determine that the registration with the cellular network is restricted. For example, when receiving a registration rejection message from the cellular network, the processor 300 may determine whether the registration with the cellular network is restricted, based on a registration rejection cause included in the registration rejection message. For example, when the registration rejection cause is “cause 6” (e.g., TS 24.008) or “cause 11” (e.g., TS 24.008), the processor 300 may determine that the registration with the cellular network is restricted.

According to an embodiment, when the registration with the cellular network is possible, the processor 300 may deactivate the sharing function (or sharing menu) of the electronic device 200. For example, when the profile of the embedded subscriber identity module (eSIM) of the electronic device 200 is activated, the processor 300 may determine that the registration with the cellular network is possible. For example, when the subscriber identity module is inserted into the electronic device 200, the processor 300 may determine that the registration with the cellular network is possible.

According to an embodiment, when the sharing function of the electronic device 200 is activated, the processor 300 may perform registration with the server 210 to share a function with the external electronic device 220. According to an embodiment, when the sharing function is activated, the processor 300 may control the communication circuit 310 to transmit information related to activation of function sharing of the electronic device 200 to the server 210. According to an embodiment, when the sharing function is activated, the processor 300 may control the communication circuit 310 to transmit a registration request message including a user account stored in the memory 330 to the server 210. When receiving information related to registration acceptance through the communication circuit 310 in response to the registration request message, the processor 300 may determine that the registration with the server 210 is achieved.

According to an embodiment, when the sharing function is activated, the processor 300 may link the at least one function (e.g., the call function and/or the message function) to the external electronic device 220. According to an embodiment, when receiving information related to reception of a message from the server 210 (or the external electronic device 220) through the communication circuit 310, the processor 300 may control the display 320 to display message reception information. According to an embodiment, when a message transmission event occurs, the processor 300 may obtain information related to transmission of a message (e.g., information related to content of the message and/or a destination) through an input device. The processor 300 may control the communication circuit 310 to transmit the information related to the transmission of the message to the server 210 (or the external electronic device 220).

According to an embodiment, when receiving information related to reception of a call from the server 210 (or the external electronic device 220) through the communication circuit 310, the processor 300 may control the display 320 to display the call reception information. According to an embodiment, when a call origination event occurs, the processor 300 may obtain information related to origination of a call (e.g., information related to a destination) through the input device. The processor 300 may control the communication circuit 310 to transmit the information related to the origination of the call to the server 210 (or the external electronic device 220). According to an embodiment, when a call is connected to a destination terminal, the processor 300 may control the communication circuit 310 to transmit and/or receive call data (e.g., voice data and/or video data) to and/or from the destination terminal through the server 210 and/or the external electronic device 220.

According to an embodiment, when the sharing function is activated, the processor 300 may support origination of an emergency call. For example, when an emergency call origination event occurs while the sharing function is activated, the processor 300 may control the communication circuit 310 to originate an emergency call through the cellular network.

According to an embodiment, when the sharing function is activated, the processor 300 may control the communication circuit 310 to restrict origination and/or reception of a call through the cellular network except for an emergency call. According to an embodiment, when the sharing function is activated, the processor 300 may control the communication circuit 310 to restrict transmission and/or reception of a message through the cellular network.

According to an embodiment, when the sharing function is deactivated, the processor 300 may perform deregistration from the server 210. According to an embodiment, when the sharing function is deactivated, the processor 300 may control the communication circuit 310 to transmit information related to deactivation of function sharing of the electronic device 200 to the server 210. According to an embodiment, when the sharing function is deactivated, the processor 300 may control the communication circuit 310 to transmit a deregistration signal to the server 210. When receiving information related to deregistration acceptance from the server 210 through the communication circuit 310 in response to the deregistration signal, the processor 300 may determine that the deregistration from the server 210 is achieved.

According to an embodiment, the sharing function is deactivated, the processor 300 may perform the at least one function (e.g., the call function and/or the message function). According to an embodiment, when the sharing function is deactivated, the processor 300 may control the communication circuit 310 to originate and/or receive a call through the cellular network. According to an embodiment, when the sharing function is deactivated, the processor 300 may control the communication circuit 310 to transmit and/or receive a message through the cellular network.

According to an embodiment, when the call function of the electronic device 200 is activated, the processor 300 may control the communication circuit 310 to provide the call function using the same phone number as that of the external electronic device 220.

According to an embodiment, the communication circuit 310 may transmit and/or receive a signal to and/or from an external device (e.g., the server 210 and/or the external electronic device 220) through the cellular network. According to an embodiment, the communication circuit 310 may include a radio-frequency integrated circuit (RFIC) and a radio-frequency front end (RFFE) for communication with the external device.

According to an embodiment, the display 320 may display information processed in the electronic device 200. According to an embodiment, the display 320 may display notification information related to a message received through the communication circuit 310, based on control of the processor 300. According to an embodiment, the display 320 may display notification information related to reception of a call received through the communication circuit 310, based on control of the processor 300.

According to an embodiment, the memory 330 may store various types of data used by at least one component (e.g., the processor 300, the communication circuit 310, and/or the display 320) of the electronic device 200. For example, the data may include the function configuration information about the electronic device 200 and/or information related to a user account.

According to an embodiment, the electronic device 200 may further include a short-range communication circuit for short-range communication. According to an embodiment, when the sharing function is activated, the processor 300 may perform registration with the server 210 through the short-range communication circuit. In this case, the processor 300 may restrict operation of the communication circuit 310 to deactivate the call function and/or the message function using the cellular network. For example, when the sharing function is activated, the communication circuit 310 may be deactivated (e.g., OFF) under control of the processor 300. The short-range communication may include, for example, at least one of Bluetooth, Bluetooth Low Energy (BLE), and a wireless local area network (WLAN).

According to an embodiment, the electronic device 200 may further include a subscriber identity module. According to an embodiment, the subscriber identity module may store subscriber identification information (e.g., an international mobile subscriber identity (IMSI)) for access, authentication, billing, and/or security in the cellular network. According to an embodiment, the subscriber identity module may be configured in a form of an integrated circuit (IC) card and mounted in a slot of the electronic device 200. According to another embodiment, the subscriber identity module may be configured in a form of an embedded SIM (eSIM) (or embedded universal integrated circuit card (eUICC)) directly embedded in the electronic device 200.

According to an embodiment, an electronic device (e.g., the electronic device of FIG. 1 or the electronic device 200 of FIG. 2 or FIG. 3) may include a communication circuit (e.g., the wireless communication module 192 of FIG. 1 or the communication circuit 310 of FIG. 3) configured to perform communication via a cellular network and a processor (e.g., the processor 120 of FIG. 1 or the processor 300 of FIG. 3) operatively connected to the communication circuit, wherein the processor may identify whether a call function using the cellular network is restricted, may activate a function of sharing with an external electronic device when the call function is restricted, may establish communication with a server through the communication circuit, based on activation of the function of sharing, and may transmit and/or receive at least one piece of data related to the function of sharing with the external electronic device to and/or from the server.

According to an embodiment, the electronic device may further include a memory (the memory 130 of FIG. 1 or the memory 330 of FIG. 3), wherein the processor may identify function configuration information about the electronic device stored in the memory, and may determine that the call function using the cellular network is restricted when the electronic device is configured as a data-centric device, based on the function configuration information about the electronic device.

According to an embodiment, the processor may determine that the call function using the cellular network is restricted when a subscriber identity module is not inserted into the electronic device.

According to an embodiment, the processor may determine that the call function using the cellular network is restricted when a profile of a subscriber identity module included in the electronic device is deactivated.

According to an embodiment, the processor may transmit a registration request signal to a first network through the communication circuit, may identify a registration rejection cause when receiving a registration rejection signal from the first network, and may determine, based on the registration rejection cause, that the call function using the cellular network is restricted.

According to an embodiment, the processor may transmit information related to origination of a call to the external electronic device through the server when receiving an input related to the origination of the call while the function of sharing is activated.

According to an embodiment, the electronic device may further include a display (e.g., the display module 160 of FIG. 1 or the display 320 of FIG. 3), wherein the processor may control the display to display information related to reception of a call when receiving the information related to the reception of the call from the server while the function of sharing is activated.

According to an embodiment, the processor may control the communication circuit to restrict origination and/or reception of a call using the cellular network when the function of sharing is activated.

According to an embodiment, the processor may control the communication circuit to originate an emergency call through the cellular network when receiving an input related to origination of the emergency call while the function of sharing is activated.

According to an embodiment, the processor may control the communication circuit to receive and/or originate a call by using the same phone number as that of the external electronic device when the call function using the cellular network is activated.

Figure 4:
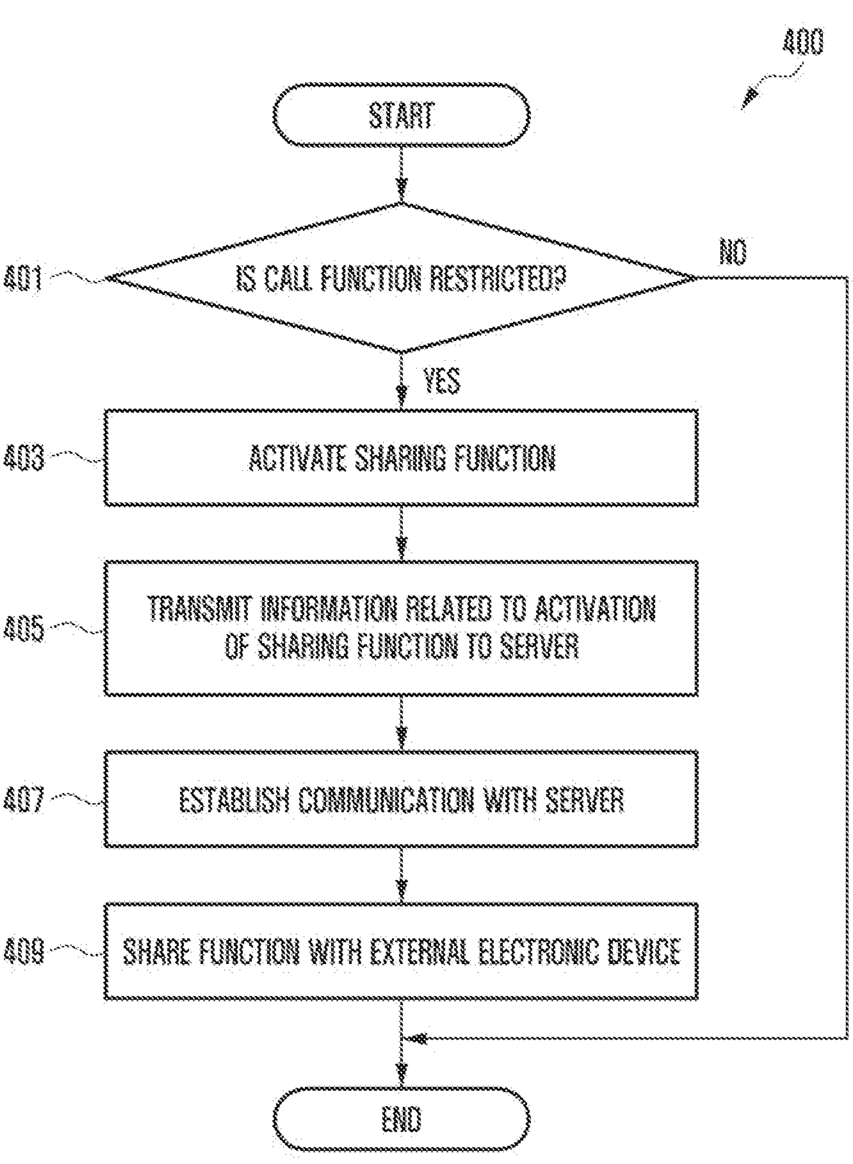
FIG. 4 is a flowchart showing that an electronic device shares at least one function with an external electronic device, based on whether a call function is provided, according to an embodiment.

FIG. 4 is a flowchart 400 showing that an electronic device shares at least one function with an external electronic device, based on whether a call function is provided, according to an embodiment. In the following embodiments, operations may be sequentially performed, but are not necessarily performed sequentially. For example, the operations may be performed in a different order, or at least two operations may be performed in parallel. For example, the electronic device of FIG. 4 may be the electronic device 101 of FIG. 1 or the electronic device 200 of FIG. 2 or FIG. 3.

Referring to FIG. 4, according to an embodiment, in operation 401, the electronic device (e.g., the processor 120 of FIG. 1 or the processor 300 of FIG. 3) may identify whether a call function of the electronic device (e.g., the electronic device 200 of FIG. 3) is restricted. According to an embodiment, when the electronic device 200 is driven (e.g., booted), the processor 300 may identify whether the electronic device 200 is configured as a data-centric device, based on function configuration information about the electronic device 200 stored in a memory 330. For example, when the electronic device 200 is configured as the data-centric device, the processor 300 may determine that the call function is restricted. In another example, when the electronic device 200 is not configured as the data-centric device, the processor 300 may determine that the call function is not restricted.

According to an embodiment, the processor 300 may identify whether registration with a cellular network through a communication circuit 310 is restricted. For example, when the registration with the cellular network through the communication circuit 310 is restricted, the processor 300 may determine that the call function is restricted. In another example, when the registration with the cellular network through the communication circuit 310 is possible, the processor 300 may determine that the call function is not restricted.

According to an embodiment, when the call function of the electronic device (e.g., the electronic device 200 of FIG. 3) is not restricted (e.g., 'No' in operation 401), the electronic device (e.g., the processor 120 or 300) may terminate an embodiment of sharing at least one function with the external electronic device (e.g., the external electronic device 220 of FIG. 2). According to an embodiment, when determining that the call function of the electronic device 200 is providable, the processor 300 may deactivate a sharing function of the electronic device 200.

According to an embodiment, when the call function of the electronic device (e.g., the electronic device 200 of FIG. 3) is restricted (e.g., 'Yes' in operation 401), the electronic device (e.g., the processor 120 or 300) may activate the sharing function of the electronic device (e.g., the electronic device 200 of FIG. 3) in operation 403.

According to an embodiment, in operation 405, the electronic device (e.g., the processor 120 or 300) may transmit information related to activation of the sharing function of the electronic device (e.g., the electronic device 200 of FIG. 3) to a server (e.g., the server 210 of FIG. 2). According to an embodiment, when the sharing function of the electronic device 200 is activated, the processor 300 may control the communication circuit 310 to transmit the information related to the activation of the sharing function of the electronic device 200 to the server 210.

According to an embodiment, in operation 407, the electronic device (e.g., the processor 120 or 300) may establish communication with the server (e.g., the server 210 of FIG. 2) to share a function with the external electronic device (e.g., the external electronic device 220 of FIG. 2). According to an embodiment, when the sharing function of the electronic device 200 is activated, the processor 300 may control the communication circuit 310 to transmit a registration request message including information related to a user account stored in the memory 330 to the server 210. When receiving information related to registration acceptance through the communication circuit 310 in response to the registration request message, the processor 300 may determine that registration with the server 210 is achieved.

According to an embodiment, in operation 409, the electronic device (e.g., the processor 120 or 300) may share at least one function with the external electronic device (e.g., the external electronic device 220 of FIG. 2) via the server (e.g., the server 210 of FIG. 2). According to an embodiment, when receiving information related to reception of a message from the server 210 (or the external electronic device 220) through the communication circuit 310, the processor 300 may control a display 320 to display message reception information. For example, the processor 300 may receive a message through the cellular network by sharing a message function of the external electronic device 220.

According to an embodiment, when a message transmission event occurs, the processor 300 may obtain information related to transmission of a message (e.g., content of the message and/or information related to a destination). The processor 300 may control the communication circuit 310 to transmit the information related to the transmission of the message to the server 210 (or the external electronic device 220). For example, the processor 300 may transmit a message through the cellular network by sharing the message function of the external electronic device 220.

According to an embodiment, when receiving information related to reception of a call from the server 210 (or the external electronic device 220) through the communication circuit 310, the processor 300 may control the display 320 to display call reception information. According to an embodiment, when a call origination event occurs, the processor 300 may obtain information related to origination of a call (e.g., a destination). The processor 300 may control the communication circuit 310 to transmit the information related to the origination of the call to the server 210 (or the external electronic device 220). According to an embodiment, when the call is connected to a destination terminal, the processor 300 may control the communication circuit 310 to transmit and/or receive call data (e.g., voice data and/or video data) through the server 210 and/or the external electronic device 220. For example, the processor 300 may transmit and/or receive at least one of the information related to the reception of the call, the information related to the origination of the call, or the call data through the cellular network by sharing a call function of the external electronic device 220.

According to an embodiment, when the sharing function is activated, the electronic device 200 may restrict origination and/or reception of a call through the cellular network except for an emergency call.

According to an embodiment, when the sharing function is activated, the electronic device 200 may restrict transmission and/or reception of a message through the cellular network.

According to an embodiment, when the sharing function is activated, the electronic device 200 may perform a registration procedure with the server 210. According to an embodiment, when the sharing function of the electronic device 200 is activated (e.g., operation 403 of FIG. 4), the processor 300 may establish communication with the server 210 in operation 407. For example, operation 405 of FIG. 4 may be omitted. According to an embodiment, when receiving the registration request message from the electronic device 200, the server 210 may determine that the sharing function of the electronic device 200 is activated.

Figure 5:
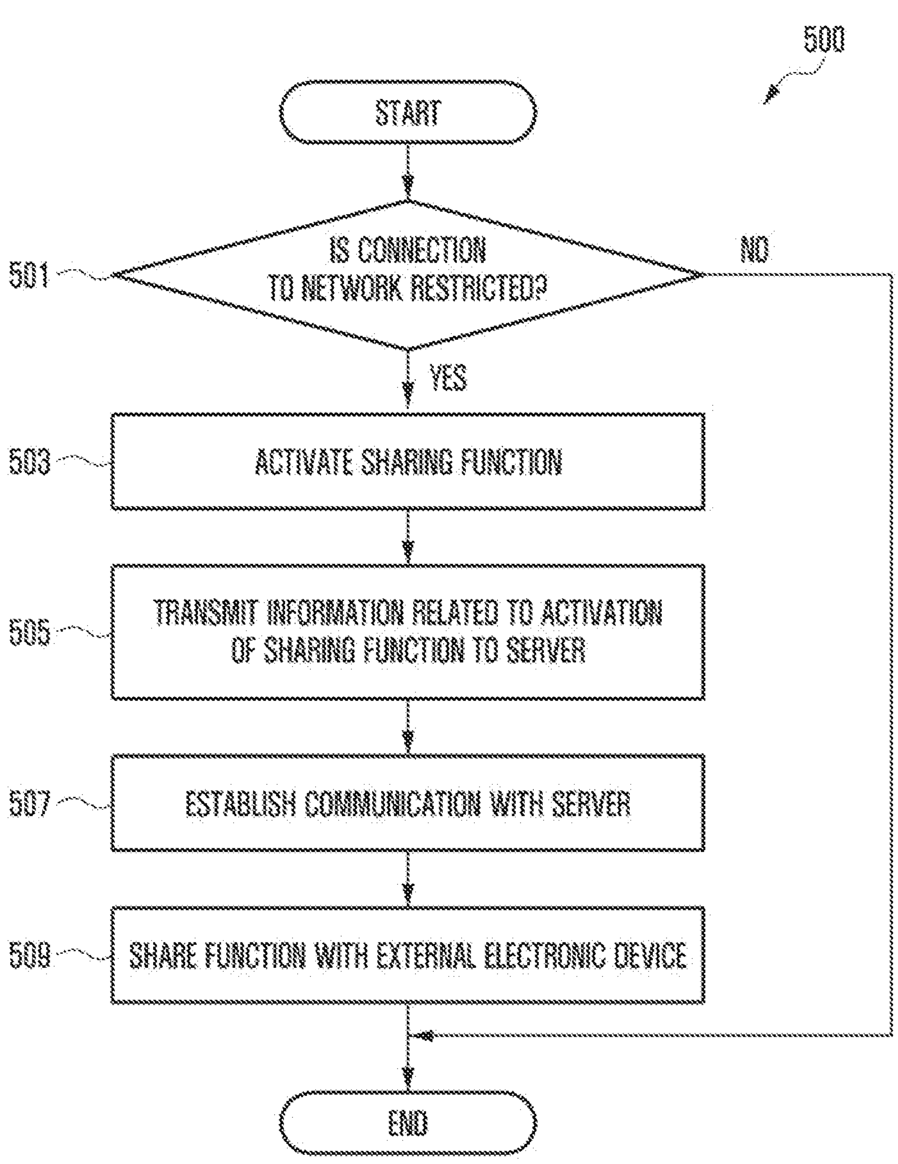
FIG. 5 is a flowchart showing that an electronic device shares at least one function with an external electronic device, based on whether registration with a network is possible, according to an embodiment.

FIG. 5 is a flowchart 500 showing that an electronic device shares at least one function with an external electronic device, based on whether registration with a network is possible, according to an embodiment. In the following embodiments, operations may be sequentially performed, but are not necessarily performed sequentially. For example, the operations may be performed in a different order, or at least two operations may be performed in parallel. For example, the electronic device of FIG. 5 may be the electronic device 101 of FIG. 1 or the electronic device 200 of FIG. 2 or FIG. 3.

Referring to FIG. 5, according to an embodiment, in operation 501, the electronic device (e.g., the processor 120 of FIG. 1 or the processor 300 of FIG. 3) may identify whether registration of the electronic device (e.g., the electronic device 200 of FIG. 3) with a cellular network is restricted. According to an embodiment, when a subscriber identity module is not inserted (or mounted) in the electronic device 200, the processor 300 may determine that the registration with the cellular network is restricted. According to an embodiment, when the subscriber identity module is inserted (or mounted) in the electronic device 200, the processor 300 may determine that the registration with the cellular network is not restricted. According to an embodiment, when a profile of an embedded subscriber identity module of the electronic device 200 is deactivated, the processor 300 may determine that the registration with the cellular network is restricted. According to an embodiment, when the profile of the embedded subscriber identity module of the electronic device 200 is activated, the processor 300 may determine that the registration with the cellular network is not restricted. According to an embodiment, when receiving a registration rejection message from the cellular network, the processor 300 may determine whether the registration with the cellular network is restricted, based on a registration rejection cause included in the registration rejection message. For example, when the registration rejection cause of is “cause 6” or “cause 11”, the processor 300 may determine that the registration with the cellular network is restricted.

According to an embodiment, when the registration of the electronic device (e.g., the electronic device 200 of FIG. 3) with the cellular network is not restricted (e.g., ‘No’ in operation 501), the electronic device (e.g., the processor 120 or 300) may terminate an embodiment of sharing at least one function with the external electronic device (e.g., the external electronic device 220 of FIG. 2). According to an embodiment, when determining that the registration of the electronic device 200 with the cellular network is possible, the processor 300 may deactivate a sharing function of the electronic device 200.

According to an embodiment, when the registration of the electronic device (e.g., the electronic device 200 of FIG. 3) with the cellular network is restricted (e.g., ‘Yes’ in operation 501), the electronic device (e.g., the processor 120 or 300) may activate the sharing function of the electronic device 200 in operation 503.

According to an embodiment, in operation 505, the electronic device (e.g., the processor 120 or 300) may transmit information related to activation of the sharing function of the electronic device (e.g., the electronic device 200 of FIG. 3) to a server (e.g., the server 210 of FIG. 2). According to an embodiment, when the sharing function of the electronic device 200 is activated, the processor 300 may control a communication circuit 310 to transmit activation information about the sharing function of the electronic device 200 to the server 210.

According to an embodiment, in operation 507, the electronic device (e.g., the processor 120 or 300) may establish communication with the server (E.g., the server 210 of FIG. 2) to share a function with the external electronic device (e.g., the external electronic device 220 of FIG. 2).

According to an embodiment, in operation 509, the electronic device (e.g., the processor 120 or 300) may share at least one function with the external electronic device (e.g., the external electronic device 220 of FIG. 2) through the server (e.g., the server 210 of FIG. 2). According to an embodiment, the processor 300 may control the communication circuit 310 to transmit and/or receive a message through the server 210 (or the external electronic device 220). According to an embodiment, the processor 300 may control the communication circuit 310 to transmit and/or receive at least one of information related to reception of a call, information related to origination of a call, or call data through the server 210 (or the external electronic device 220).

According to an embodiment, when the sharing function is activated, the electronic device 200 may perform a procedure for registration with the server 210. According to an embodiment, when the sharing function of the electronic device 200 is activated (e.g., operation 503 of FIG. 5), the processor 300 may establish the communication with the server 210 in operation 507. For example, operation 505 of FIG. 5 may be omitted. According to an embodiment, when receiving a registration request message from the electronic device 200, the server 210 may determine that the sharing function of the electronic device 200 is activated.

Figure 6:
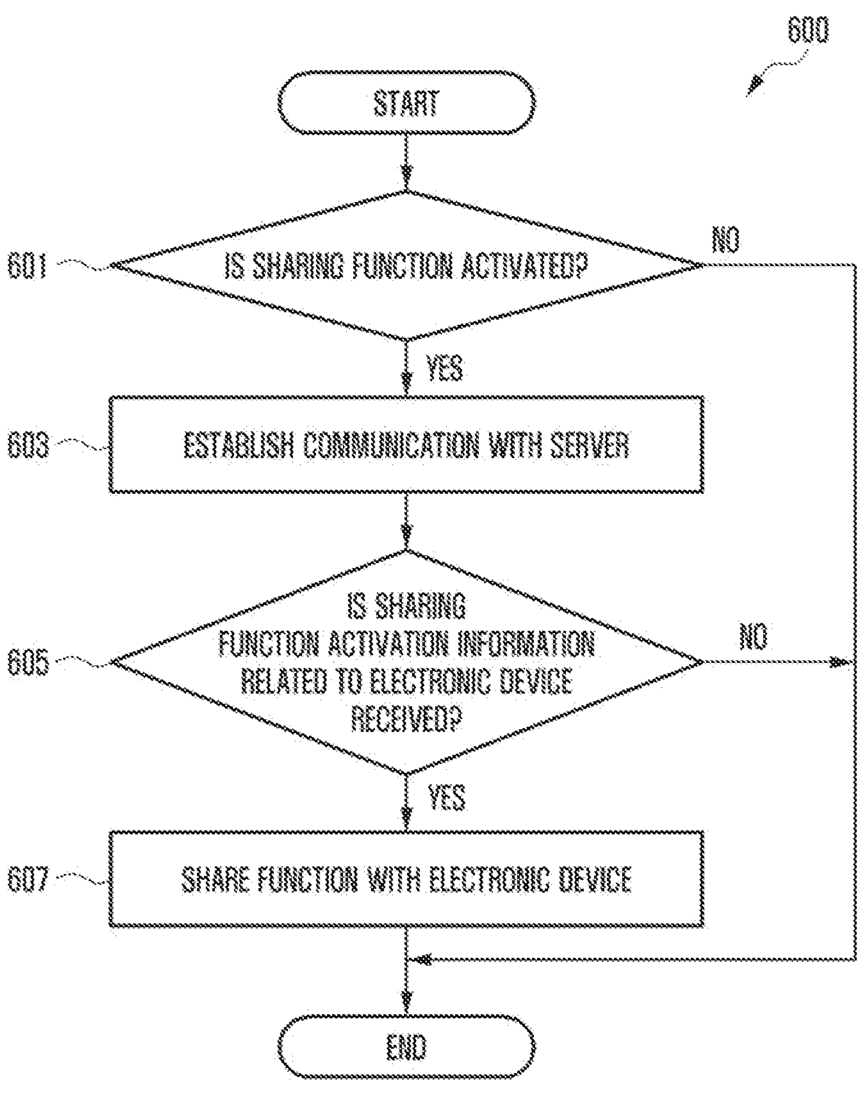
FIG. 6 is a flowchart showing that an external electronic device shares at least one function with an electronic device according to an embodiment.
Figure 7A:
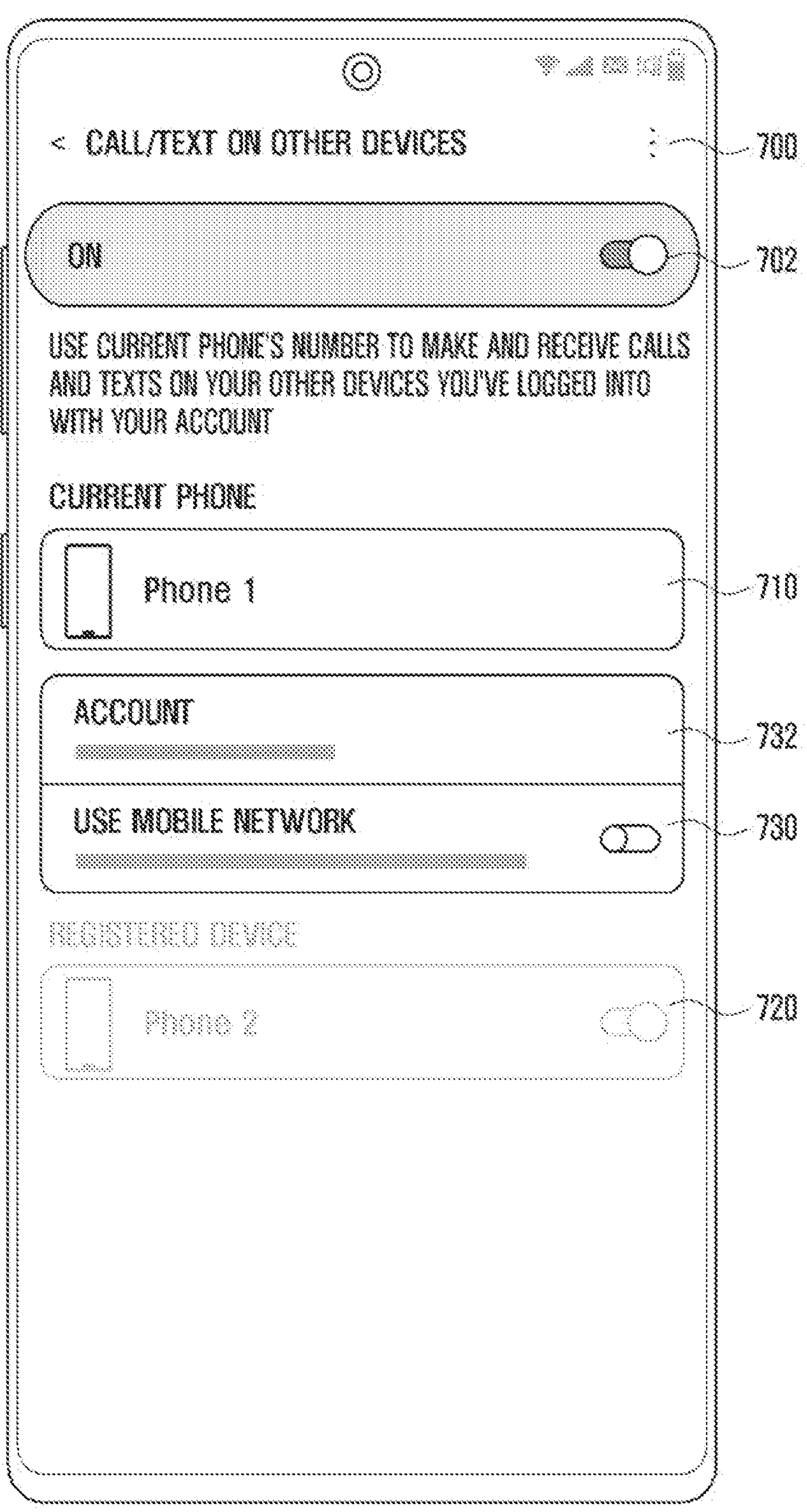
FIG. 7A illustrates an example of a screen configuration for an external electronic device to configure function sharing with an electronic device according to an embodiment.
Figure 7B:
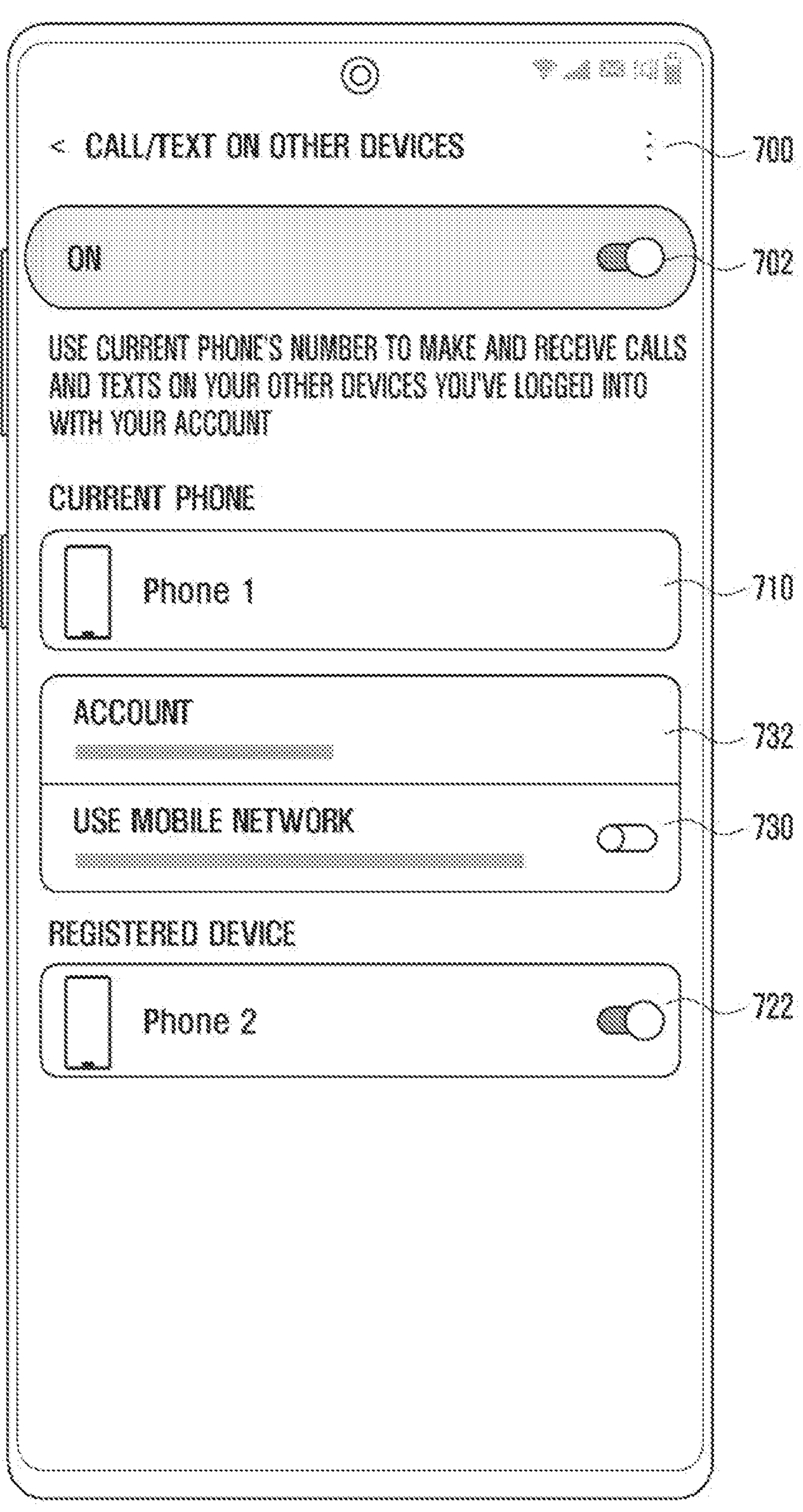
FIG. 7B illustrates another example of a screen configuration for an external electronic device to configure function sharing with an electronic device according to an embodiment.

FIG. 6 is a flowchart 600 showing that an external electronic device shares at least one function with an electronic device according to an embodiment. In the following embodiments, operations may be sequentially performed, but are not necessarily performed sequentially. For example, the operations may be performed in a different order, or at least two operations may be performed in parallel. For example, the external electronic device of FIG. 6 may be the electronic device 101 of FIG. 1 or the external electronic device 220 of FIG. 2. In an example, at least part of FIG. 6 may be described with reference to FIG. 7A and FIG. 7B. FIG. 7A illustrates an example of a screen configuration for an external electronic device to configure function sharing with an electronic device according to an embodiment. FIG. 7B illustrates another example of a screen configuration for an external electronic device to configure function sharing with an electronic device according to an embodiment.

Referring to FIG. 6, according to an embodiment, in operation 601, the external electronic device (e.g., the processor 120 of FIG. 1) may identify whether a sharing function of sharing at least one function with the electronic device (e.g., the electronic device 200 of FIG. 2) is activated. According to an embodiment, the external electronic device 220 (e.g., the processor 120) may identify whether the sharing function (or sharing menu) is activated based on a user input.

According to an embodiment, when the sharing function of sharing the at least one function with the electronic device (e.g., the electronic device 200 of FIG. 2) is deactivated (e.g., 'No' in operation 601), the external electronic device (e.g., the processor 120) may terminate an embodiment of sharing at least one function with the electronic device (e.g., the electronic device 200 of FIG. 2).

According to an embodiment, the sharing function of sharing the at least one function with the electronic device (e.g., the electronic device 200 of FIG. 2) is activated (e.g., 'Yes' in operation 601), the external electronic device (e.g., the processor 120) may establish communication with a server (e.g., the server 210 of FIG. 2) to share a function with the electronic device (e.g., the electronic device 200 of FIG. 2) in operation 603. According to an embodiment, when the sharing function of the external electronic device 220 is activated, the external electronic device 220 (e.g., the processor 120) may transmit a registration request message including information related to a user account of the external electronic device 220 to the server 210. When receiving information related to registration acceptance from the server 210 in response to the registration request message, the external electronic device 220 (e.g., the processor 120) may determine that the external electronic device 220 is registered with the server 210.

According to an embodiment, in operation 605, the external electronic device (e.g., the processor 120) may identify whether function sharing activation information related to the electronic device (e.g., the electronic device 200 of FIG. 2) is received. According to an embodiment, the external electronic device 220 (e.g., the processor 120) may transmit a request signal related to a different electronic device (e.g., the electronic device 200) for sharing at least one function to the server 210. The external electronic device 220 (e.g., the processor 120) may receive information related to the electronic device 200 including the same user account as that of the external electronic device 220 from the server 210 in response to the request signal. For example, the information related to the electronic device 200 may include at least one of identification information about the electronic device 200, the function sharing activation information about the electronic device 200, and function sharing deactivation information about the electronic device 200.

According to an embodiment, when receiving the function sharing deactivation information related to the electronic device (e.g., the electronic device 200 of FIG. 2) (e.g., 'No' in operation 605), the external electronic device (e.g., the processor 120) may terminate the embodiment of sharing the at least one function with the electronic device. According to an embodiment, when failing to receive the information related to the different electronic device 200 including the same user account as that of the external electronic device 220 from the server 210 in response to the request signal, the external electronic device 220 (e.g., the processor 120) may determine that there is no different electronic device with which at least one function is shared. Accordingly, the external electronic device 220 (e.g., the processor 120) may terminate the embodiment of sharing the at least one function.

According to an embodiment, when receiving the function sharing deactivation information about the electronic device 200 including the same user account as that of the external electronic device 220 from the server 210 in response to the request signal, the external electronic device 220 (e.g., the processor 120) may display a user interface 700 related to function sharing showing that the different electronic device for function sharing is in an inactive state 720, as shown in FIG. 7A. For example, the user interface 700 related to function sharing may include a first object 702 for selecting whether to activate the sharing function of the external electronic device 220, identification information 710 about the external electronic device 220, identification information 720 about an electronic device for function sharing, a second object 730 for configuring whether to use a cellular network for the sharing function, and/or user account information 732. For example, the identification information 720 about the electronic device for function sharing may be displayed in an inactive state when a sharing function of the electronic device (e.g., the electronic device 200) capable of sharing at least one function with the external electronic device 220 is deactivated. For example, when the second object 730 is in an active state, the external electronic device 220 may transmit and/or receive information for sharing at least one function with the server 210 (or the electronic device 200) through the cellular network. In another example, when the second object 730 is in an inactive state, the external electronic device 220 may be restricted from using the cellular network for transmitting and/or receiving the information for sharing the at least one function with the server 210 (or the electronic device 200). In this case, the external electronic device 220 may transmit and/or receive the information for sharing the at least one function with the server 210 (or the electronic device 200) through a local area network.

According to an embodiment, when the function sharing activation information related to the electronic device (e.g., the electronic device 200 of FIG. 2) is received (e.g., 'Yes' in operation 605), the external electronic device (e.g., the processor 120) may share at least one function with the electronic device (e.g., the electronic device 200 of FIG. 2) through the server (e.g., the server 210 of FIG. 2) in operation 607. According to an embodiment, when receiving the function sharing activation information about the electronic device 200 including the same user account as that of the external electronic device 220 from the server 210 in response to the request signal, the external electronic device 220 (e.g., the processor 120) may display a user interface 700 related to function sharing showing that the different electronic device for function sharing is in an active state 722, as shown in FIG. 7B.

According to an embodiment, when the electronic device 200 for sharing the at least one function is in the active state, the external electronic device 220 (e.g., the processor 120) may transmit and/or receive information related to sharing of the at least one function through the server 210. For example, when receiving a message through the cellular network, the external electronic device 220 (e.g., the processor 120) may transmit information related to reception of the message to the server 210. For example, when receiving information related to transmission of a message through the cellular network, the external electronic device 220 (e.g., the processor 120) may transmit a message through the cellular network, based on the information related to the transmission of the message to the server 210. For example, when receiving a call through the cellular network, the external electronic device 220 (e.g., the processor 120) may transmit information related to reception of the call to the server 210. For example, when receiving information related to origination of a call from the server 210, the external electronic device 220 (e.g., the processor 120) may originate a call through the cellular network, based on the information related to the origination of the call. For example, when a call is connected to a destination terminal, the external electronic device 220 (e.g., the processor 120) may transmit and/or receive call data (e.g., voice data and/or video data) transmitted to and/or received from the destination terminal through the cellular network to and/or from the electronic device 200 via the server 210.

FIG. 8 illustrates an example in which an electronic device shares at least one function with an external electronic device according to an embodiment.

Referring to FIG. 8, according to an embodiment, the electronic device 200 may include a state check module 802, a call control module 804, and a sharing control module 806. According to an embodiment, the state check module 802, the call control module 804, and/or the sharing control module 806 may be configured as software (e.g., the program 140 of FIG. 1). For example, the state check module 802, the call control module 804, and/or the sharing control module 806 may be logically (e.g., software) separated within the processor 300 of FIG. 3. According to an embodiment, the state check module 802, the call control module 804, and/or the sharing control module 806 may be configured as different circuits or different pieces of hardware.

According to an embodiment, when a sharing function of sharing at least one function is activated, the external electronic device 220 may perform a procedure for registration with a server 210 (operation 821). According to an embodiment, when the sharing function is activated, the external electronic device 220 may transmit a registration request message including information related to a user account of the external electronic device 220 to the server 210. When receiving information related to registration acceptance from the server 210 in response to the registration request message, the external electronic device 220 may determine that the external electronic device 220 is registered with the server 210.

According to an embodiment, the state check module 802 of the electronic device 200 may identify whether a call function (or registration with a cellular network) of the electronic device 200 is restricted. According to an embodiment, when the electronic device 200 is configured as a data-centric device, the state check module 802 may determine that the call function is restricted. For example, when the electronic device 200 is driven (e.g., booted), the state check module 802 may identify whether the electronic device 200 is configured as the data-centric device, based on function configuration information about the electronic device 200 stored in the memory 330 of FIG. 3. According to an embodiment, when the electronic device 200 is not configured as the data-centric device, the state check module 802 may determine that the call function is not restricted.

According to an embodiment, when the registration of the electronic device 200 with the cellular network is restricted, the state check module 802 may determine that the call function is restricted. According to an embodiment, when the registration of the electronic device 200 with the cellular network is possible, the state check module 802 may determine that the call function is not restricted. For example, a state in which the registration with the cellular network is restricted may include a state in which a subscriber identity module is not inserted (or mounted) in the electronic device 200 or a state in which a profile of an embedded subscriber identity module is deactivated. For example, the state in which the registration with the cellular network is restricted may be determined based on a registration rejection cause included in a registration rejection message received from the cellular network.

According to an embodiment, when determining that the call function of the electronic device 200 is restricted, the state check module 802 of the electronic device 200 may transmit information related to call restriction to the sharing control module 806 (operation 823).

According to an embodiment, the sharing control module 806 of the electronic device 200 may activate the sharing function of the electronic device 200, based on the information related to the call restriction received from the state check module 802 (operation 825). The sharing control module 806 may transmit information related to activation of the sharing function to the server 210, based on activation of the sharing function of the electronic device 200 (operation 827).

According to an embodiment, the server 210 may transmit the information related to the activation of the sharing function of the electronic device 200 to the external electronic device 220 (operation 829). According to an embodiment, when a user account of the electronic device 200 and the user account of the external electronic device 220 are the same and the external electronic device 220 is registered with the server 210, the server 210 may transmit the information related to the activation of the sharing function of the electronic device 200 to the external electronic device 220.

According to an embodiment, the sharing control module 806 of the electronic device 200 may transmit a registration request message to the server 210, based on the activation of the sharing function of the electronic device 200 (operation 831). According to an embodiment, the sharing control module 806 may transmit a registration request message including information related to the user account stored in the memory 330 of FIG. 3 to the server 210. For example, the registration request message may include a message related to IP multimedia subsystem (IMS) registration.

According to an embodiment, when user authentication succeeds based on the information related to the user account included in the registration request message, the server 210 may accept a registration request from the electronic device 200. When accepting the registration request from the electronic device 200, the server 210 may transmit information related to acceptance of the registration request to the electronic device 200 (operation 833). According to an embodiment, the sharing control module 806 of the electronic device 200 may determine that the electronic device 200 is able to share at least one function with the external electronic device 220 through the server 210, based on the information related to the acceptance of the registration request.

According to an embodiment, when the sharing function is activated, the electronic device 200 may perform a procedure for registration with the server 210. According to an embodiment, when the sharing function of the electronic device 200 is activated (e.g., operation 825 of FIG. 8), the sharing control module 806 may transmit a registration request message to the server 210 (operation 831). For example, the server 210 may determine that the sharing function of the electronic device 200 is activated, based on the registration request message of the electronic device 200. The server 210 may transmit information related to activation of the sharing function of the electronic device 200 to the external electronic device 220 (operation 829). For example, operation 827 of FIG. 8 may be omitted.

Figure 9:
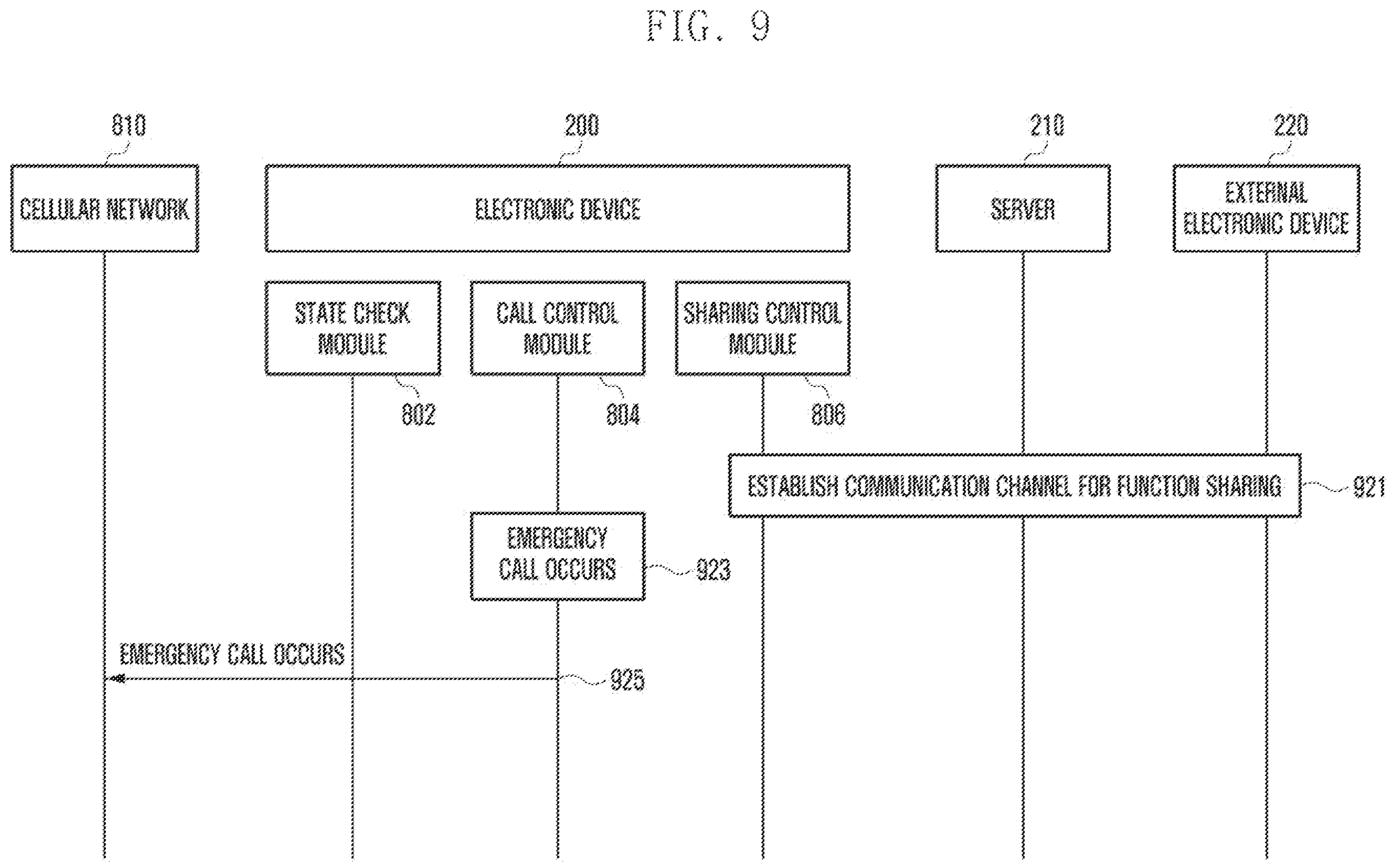
FIG. 9 illustrates an example in which an electronic device requests an emergency call according to an embodiment.

FIG. 9 illustrates an example in which an electronic device requests an emergency call according to an embodiment.

Referring to FIG. 9, according to an embodiment, a sharing control module 806 of the electronic device 200 may establish a communication channel with an external electronic device 220 through a server 210 to share at least one function. (operation 921). According to an embodiment, when a call function of the electronic device 200 is restricted or registration with a cellular network is restricted as in operation 823 to operation 833 of FIG. 8, the electronic device 200 may establish a communication channel with the server 210. According to an embodiment, when a sharing function is activated as in operation 821 of FIG. 8, the external electronic device 220 may establish a communication channel with the server 210. According to an embodiment, when a user account of the electronic device 200 and a user account of the external electronic device 210 are the same, the server 210 may determine that a communication link is established for the electronic device 200 and the external electronic device 210 to share at least one function.

According to an embodiment, a call control module 804 of the electronic device 200 may support an emergency call while a sharing function of the electronic device 200 is activated. According to an embodiment, when a call origination event occurs while the sharing function of the electronic device 200 is activated, a call control module 804 may identify whether the call origination event is related to an emergency call. When the call origination event is related to the emergency call (operation 923), the call control module 804 may originate the emergency call through a cellular network 810 (operation 925). According to an embodiment, when the emergency call is connected, the call control module 804 may transmit and/or receive call data through the cellular network.

FIG. 10 illustrates an example in which an electronic device shares a call function with an external electronic device according to an embodiment.

Referring to FIG. 10, according to an embodiment, a sharing control module 806 of the electronic device 200 may establish a communication channel with the external electronic device 220 through a server 210 to share at least one function (operation 1021).

According to an embodiment, a call control module 804 of the electronic device 200 may identify whether a call origination event occurs while a sharing function of the electronic device 200 is activated. According to an embodiment, when the call origination event occurs (operation 1023), the call control module 804 may transmit a call origination request message including information related to origination of a call (e.g., information related to a destination) to the server 210 (operation 1025). For example, when the call origination event occurs (operation 1023), the call control module 804 may identify whether the call origination event is related to an emergency call. When the call origination event is not related to the emergency call, the call control module 804 may transmit the call origination request message including the information related to the origination of the call to the server 210 (operation 1025).

According to an embodiment, the server 210 may transmit the information related to the origination of the call received from the electronic device 200 to the external electronic device 220 (operation 1027).

According to an embodiment, the external electronic device 220 may originate a call through a cellular network, based on the information related to the origination of the call received from the server 210.

According to an embodiment, when the call is connected to a destination terminal, based on the information related to the origination of the call, the external electronic device 220 may transmit and/or receive call data transmitted to and/or received from the destination terminal through the cellular network to and/or from the electronic device 200 through the server 210. According to an embodiment, the external electronic device 220 may transmit voice reception data received from the destination terminal through the cellular network to the electronic device 200 through the server 210. The electronic device 200 may externally output the voice reception data received from the server 210 through a speaker of the electronic device 200. According to an embodiment, the electronic device 200 may transmit voice transmission data collected through a microphone of the electronic device 200 to the external electronic device 220 through the server 210. The external electronic device 220 may transmit the voice transmission data received from the server 210 to the destination terminal through the cellular network.

FIG. 11 illustrates an example in which an electronic device rejects call reception according to an embodiment.

Referring to FIG. 11, according to an embodiment, a sharing control module 806 of the electronic device 200 may establish a communication channel with an external electronic device 220 through a server 210 to share at least one function (operation 1121).

According to an embodiment, a call control module 804 of the electronic device 200 may restrict reception of a call through a cellular network while a sharing function of the electronic device 200 is activated. According to an embodiment, when a call is received through the cellular network (operation 1123), the call control module 804 may transmit a rejection message related to reception of the call to the cellular network (operation 1125). In this case, the call control module 804 may restrict output of information related to the reception of the call.

FIG. 12 illustrates another example in which an electronic device shares a call function with an external electronic device according to an embodiment.

Referring to FIG. 12, according to an embodiment, a sharing control module 806 of the electronic device 200 may establish a communication channel with the external electronic device 220 through a server 210 to share at least one function (operation 1221).

According to an embodiment, a call control module 804 of the electronic device 200 may receive a call by using the external electronic device 220 while a sharing function of the electronic device 200 is activated. According to an embodiment, when receiving the call through a cellular network (operation 1223), the external electronic device 220 may transmit information related to reception of the call to the server 210 (operation 1225). The server 210 may transmit the information related to the reception of the call received from the external electronic device 220 to the electronic device 200 (or the call control module 804) (operation 1227). When receiving the information related to the reception of the call from the server 210, the call control module 804 of the electronic device 200 may output call reception information (operation 1229). For example, the call reception information may be externally output through at least one of a sound, graphic information, an indicator, or vibrations.

According to an embodiment, when receiving a user input to connect a call, the call control module 804 of the electronic device 200 may transmit a call connection request message to the external electronic device 220 through the server 210. The external electronic device 220 may connect a call to a destination terminal through the cellular network, based on the call connection request message.

According to an embodiment, when the call is connected to the destination terminal, based on the call connection request message, the external electronic device 220 may transmit and/or receive call data transmitted to and/or received from the destination terminal through the cellular network to and/or from the electronic device 200 through the server 210. According to an embodiment, the external electronic device 220 may transmit voice reception data received from the destination terminal through the cellular network to the electronic device 200 through the server 210. The electronic device 200 may externally output the voice reception data received from the server 210 through a speaker of the electronic device 200. According to an embodiment, the electronic device 200 may transmit voice transmission data collected through a microphone of the electronic device 200 to the external electronic device 220 through the server 210. The external electronic device 220 may transmit the voice transmission data received from the server 210 to the destination terminal through the cellular network.

Figure 13:
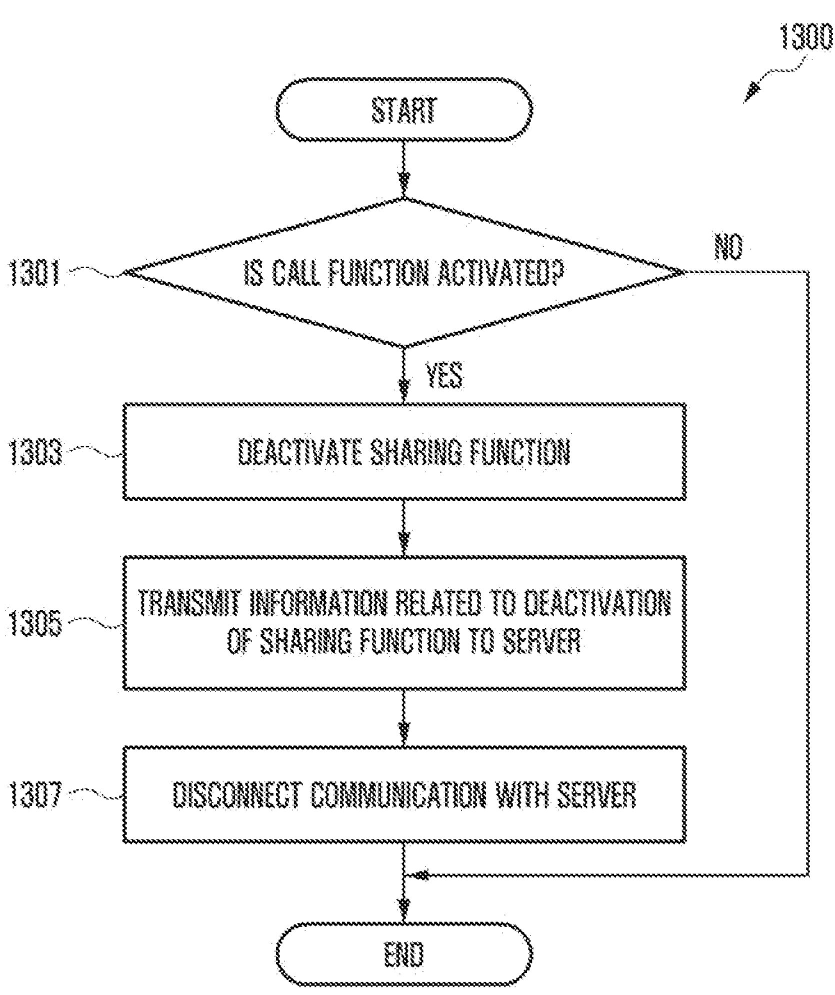
FIG. 13 is a flowchart showing that an electronic device restricts function sharing with an external electronic device, based on whether a call function is provided, according to an embodiment.

FIG. 13 is a flowchart 1300 showing that an electronic device restricts function sharing with an external electronic device, based on whether a call function is provided, according to an embodiment. In the following embodiments, operations may be sequentially performed, but are not necessarily performed sequentially. For example, the operations may be performed in a different order, or at least two operations may be performed in parallel. For example, the electronic device of FIG. 13 may be the electronic device 101 of FIG. 1 or the electronic device 200 of FIG. 2 or FIG. 3.

Referring to FIG. 13, according to an embodiment, in operation 1301, the electronic device (e.g., the processor 120 of FIG. 1 or the processor 300 of FIG. 3) may identify whether a call function is activated. According to an embodiment, the processor 300 may identify whether registration with a cellular network through a communication circuit 310 is possible. For example, when the registration with the cellular network through the communication circuit 310 is possible, the processor 300 may determine that the call function is activated. In another example, when the registration with the cellular network through the communication circuit 310 is restricted, the processor 300 may determine that the call function is restricted.

According to an embodiment, when the call function of the electronic device (e.g., the electronic device 200 of FIG. 3) is not activated (e.g., 'No' in operation 1301), the electronic device (e.g., the processor 120 or 300) may terminate an embodiment of restricting function sharing with the external electronic device (e.g., the external electronic device 220 of FIG. 2). According to an embodiment, when determining that the call function of the electronic device 200 is restricted, the processor 300 may maintain an active state of a sharing function of the electronic device 200.

According to an embodiment, when the call function of the electronic device (e.g., the electronic device 200 of FIG. 3) is activated (e.g., 'Yes' in operation 1301), the electronic device (e.g., the processor 120 or 300) may deactivate the sharing function of the electronic device (e.g., the electronic device 200 of FIG. 3) in operation 1303. According to an embodiment, as in operation 401 to operation 409 of FIG. 4, when the call function of the electronic device 200 is restricted, the processor 300 may activate the sharing function of the electronic device 200. When the call function of the electronic device 200 is activated while the sharing function of the electronic device 200 is activated, the processor 300 may switch the sharing function of the electronic device 200 to an inactive state.

According to an embodiment, in operation 1305, the electronic device (e.g., the processor 120 or 300) may transmit information related to deactivation of the sharing function of the electronic device (e.g., the electronic device 200 of FIG. 3) to a server (e.g., the server 210 of FIG. 2). According to an embodiment, when the sharing function of the electronic device 200 is deactivated, the processor 300 may control the communication circuit 310 to transmit information about deactivation of the sharing function of the electronic device 200 to the server 210.

According to an embodiment, in operation 1307, the electronic device (e.g., the processor 120 or 300) may disconnect communication with the server (e.g., the server 210 of FIG. 2). According to an embodiment, when the sharing function of the electronic device 200 is deactivated, the processor 300 may control the communication circuit 310 to transmit a deregistration request message to the server 210. When receiving information related to acceptance of deregistration through the communication circuit 310 in response to the deregistration request message, the processor 300 may determine that the communication with the server 210 is disconnected.

According to an embodiment, when the sharing function is deactivated, the electronic device 200 may originate and/or receive a call through the cellular network.

According to an embodiment, when the sharing function is deactivated, the electronic device 200 may transmit and/or receive a message through the cellular network.

According to an embodiment, when the sharing function is deactivated, the electronic device 200 may perform a procedure for deregistration from the server 210. According to an embodiment, when the sharing function of the electronic device 200 is deactivated (e.g., operation 1303 of FIG. 13), the processor 300 may disconnect the communication with the server 210 in operation 1307. For example, operation 1305 of FIG. 13 may be omitted. According to an embodiment, when receiving the deregistration request message from the electronic device 200, the server 210 may determine that the sharing function of the electronic device 200 is deactivated.

Figure 14:
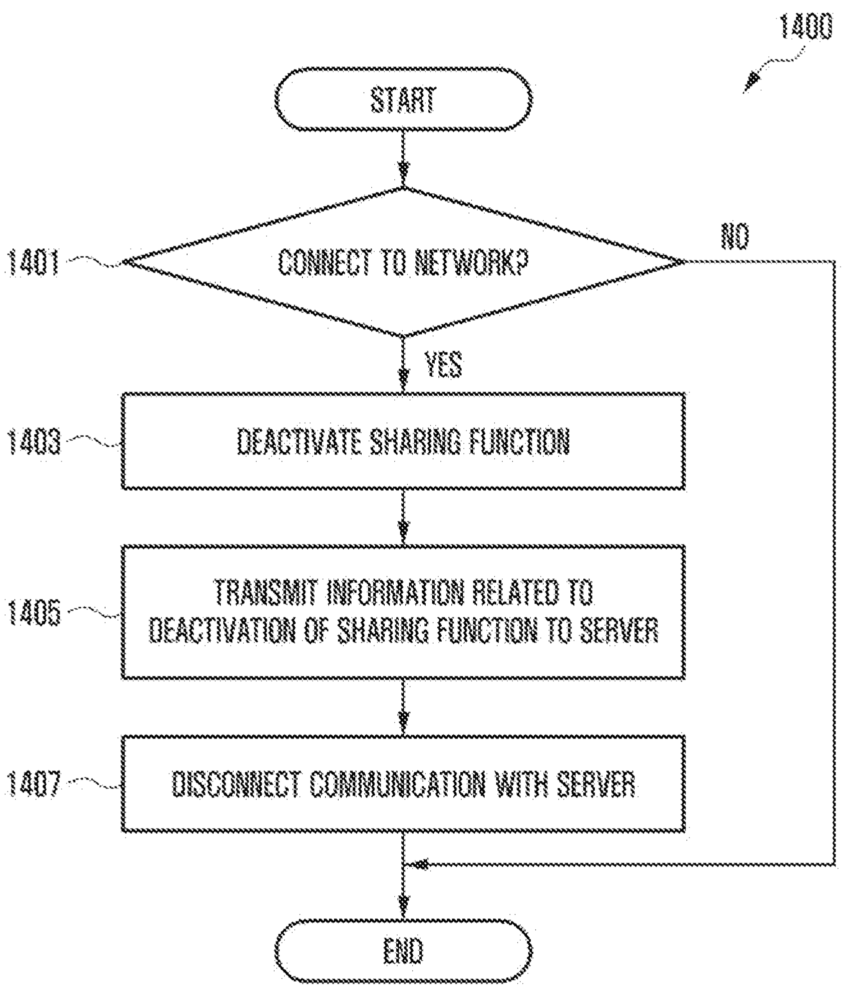
FIG. 14 is a flowchart showing that an electronic device restricts function sharing with an external electronic device, based on whether registration with a network is possible, according to an embodiment.

FIG. 14 is a flowchart 1400 showing that an electronic device restricts function sharing with an external electronic device, based on whether registration with a network is possible, according to an embodiment. In the following embodiments, operations may be sequentially performed, but are not necessarily performed sequentially. For example, the operations may be performed in a different order, or at least two operations may be performed in parallel. For example, the electronic device of FIG. 14 may be the electronic device 101 of FIG. 1 or the electronic device 200 of FIG. 2 or FIG. 3.

Referring to FIG. 14, according to an embodiment, in operation 1401, the electronic device (e.g., the processor 120 of FIG. 1 or the processor 300 of FIG. 3) may identify whether registration (connection) of the electronic device (e.g., the electronic device 200 of FIG. 3) with a cellular network is possible. According to an embodiment, when a subscriber identity module is inserted (or mounted) in the electronic device 200, the processor 300 may determine that the registration with the cellular network is possible.

According to an embodiment, when a profile of an embedded subscriber identity module is activated in the electronic device 200, the processor 300 may determine that the registration with the cellular network is possible.

According to an embodiment, when the registration of the electronic device (e.g., the electronic device 200 of FIG. 3) with the cellular network is restricted (e.g., 'No' in operation 1401), the electronic device (e.g., the processor 120 or 300) may terminate an embodiment of restricting function sharing with the external electronic device (e.g., the external electronic device 220 of FIG. 2). According to an embodiment, when the registration of the electronic device 200 with the cellular network is restricted, the processor 300 may maintain an active state of a sharing function of the electronic device 200.

According to an embodiment, when the registration of the electronic device (e.g., the electronic device 200 of FIG. 3) with the cellular network is possible (e.g., 'Yes' in operation 1401), the electronic device (e.g., the processor 120 or 300) may deactivate the sharing function of the electronic device (e.g., the electronic device 200 of FIG. 3) in operation 1403. According to an embodiment, as in operation 501 to operation 509 of FIG. 5, when the registration of the electronic device 200 with the cellular network is restricted, the processor 300 may activate the sharing function of the electronic device 200. When the registration of the electronic device 200 with the cellular network is possible while the sharing function of the electronic device 200 is activated, the processor 300 may switch the sharing function of the electronic device 200 to an inactive state.

According to an embodiment, in operation 1405, the electronic device (e.g., the processor 120 or 300) may transmit information related to deactivation of the sharing function of the electronic device (e.g., the electronic device 200 of FIG. 3) to a server (e.g., the server 210 of FIG. 2).

According to an embodiment, in operation 1407, the electronic device (e.g., the processor 120 or 300) may disconnect communication with the server (e.g., the server 210 of FIG. 2). According to an embodiment, when the sharing function of the electronic device 200 is deactivated, the processor 300 may control a communication circuit 310 to transmit a deregistration request message to the server 210. When receiving information related to acceptance of deregistration through the communication circuit 310 in response to the deregistration request message, the processor 300 may determine that the communication with the server 210 is disconnected.

According to an embodiment, when the sharing function is deactivated, the electronic device 200 may perform may perform a procedure for deregistration from the server 210. According to an embodiment, when the sharing function of the electronic device 200 is deactivated (e.g., operation 1403 of FIG. 14), the processor 300 may disconnect the communication with the server 210 in operation 1407. For example, operation 1405 of FIG. 14 may be omitted. According to an embodiment, when receiving the deregistration request message from the electronic device 200, the server 210 may determine that the sharing function of the electronic device 200 is deactivated.

Figure 15:
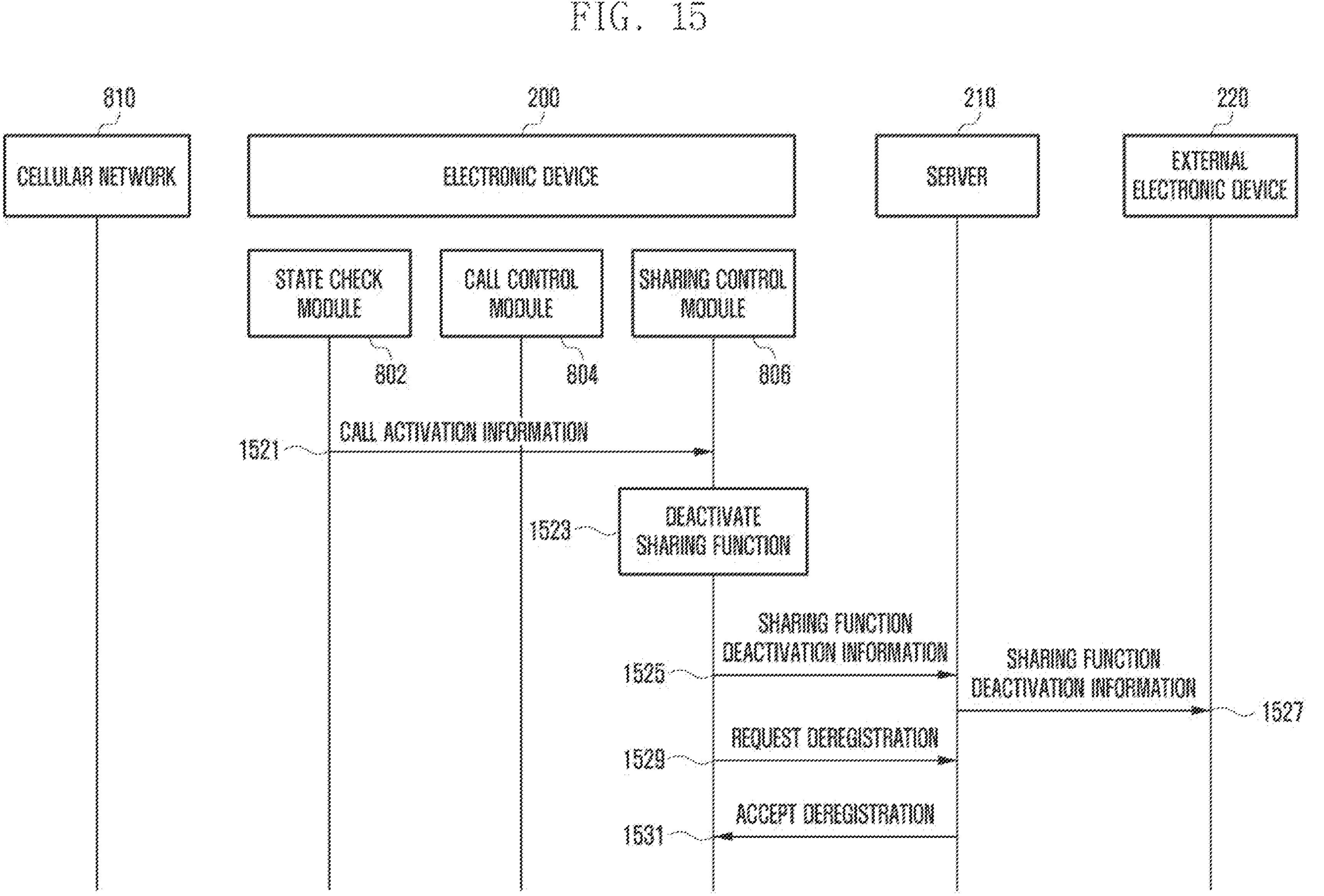
FIG. 15 illustrates an example in which an electronic device restricts function sharing with an external electronic device according to an embodiment.

FIG. 15 illustrates an example in which an electronic device restricts function sharing with an external electronic device according to an embodiment.

Referring to FIG. 15, according to an embodiment, a state check module 802 of the electronic device 200 may identify whether a call function (or registration with a cellular network) of the electronic device 200 is activated. According to an embodiment, when the registration of the electronic device 200 with the cellular network is possible, the state check module 802 may determine that the call function is activated. For example, a state in which the registration with the cellular network is possible may include a state in which a subscriber identity module is inserted (or mounted) in the electronic device 200 or a state in which a profile of an embedded subscriber identity module is activated.

According to an embodiment, when determining that the call function of the electronic device 200 is activated, the state check module 802 of the electronic device 200 may transmit information related to activation of a call to a sharing control module 806 (operation 1521).

According to an embodiment, the sharing control module 806 of the electronic device 200 may deactivate a sharing function of the electronic device 200, based on the information related to the activation of the call received from the state check module 802 (operation 1523). The sharing control module 806 may transmit information related to deactivation of the sharing function to a server 210, based on the deactivation of the sharing function of the electronic device 200 (operation 1525).

According to an embodiment, the server 210 may transmit the information related to the deactivation of the sharing function of the electronic device 200 to the external electronic device 220 (operation 1527). According to an embodiment, when a user account of the electronic device 200 and a user account of the external electronic device 220 are the same and the external electronic device 220 is registered with the server 210, the server 210 may transmit the information related to the deactivation of the sharing function of the electronic device 200 to the external electronic device 220.

According to an embodiment, the sharing control module 806 of the electronic device 200 may transmit a deregistration request message to the server 210, based on the deactivation of the sharing function of the electronic device 200 (operation 1529). For example, the deregistration request message may include a message related to IMS deregistration.

According to an embodiment, when user authentication succeeds based on information related to the user account included in the deregistration request message, the server 210 may accept a deregistration request from the electronic device 200. When accepting the deregistration request from the electronic device 200, the server 210 may transmit information related to acceptance of the deregistration request to the electronic device 200 (operation 1531). According to an embodiment, the sharing control module 806 of the electronic device 200 may determine that communication with the server 210 is disconnected, based on the information related to the acceptance of the deregistration request.

According to an embodiment, when the sharing function is deactivated, the electronic device 200 may perform a procedure for registration with the server 210. According to an embodiment, when the sharing function of the electronic device 200 is deactivated (e.g., operation 1523 of FIG. 15), the sharing control module 806 may transmit the deregistration request message to the server 210 (operation 1529). For example, the server 210 may determine that the sharing function of the electronic device 200 is deactivated, based on the deregistration request message of the electronic device 200. The server 210 may transmit the information related to the deactivation of the sharing function of the electronic device 200 to the external electronic device 220 (operation 1527). For example, operation 1525 of FIG. 15 may be omitted.

According to an embodiment, an operating method of an electronic device (e.g., the electronic device of FIG. 1 or the electronic device 200 of FIG. 2 or FIG. 3) may include identifying whether a call function using a cellular network is restricted when a communication circuit configured to perform communication via the cellular network is included, activating a function of sharing with an external electronic device when the call function is restricted, establishing communication with a server, based on activation of the function of sharing, and transmitting and/or receiving at least one piece of data related to the function of sharing with the external electronic device to and/or from the server.

According to an embodiment, the identifying whether the call function using the cellular network is restricted may include identifying function configuration information about the electronic device stored in a memory of the electronic device, and determining that the call function using the cellular network is restricted when the electronic device is configured as a data-centric device, based on the function configuration information about the electronic device.

According to an embodiment, the identifying whether the call function using the cellular network is restricted may include determining that the call function using the cellular network is restricted when a subscriber identity module is not inserted into the electronic device.

According to an embodiment, the identifying whether the call function using the cellular network is restricted may include determining that the call function using the cellular network is restricted when a profile of a subscriber identity module included in the electronic device is deactivated.

According to an embodiment, the identifying whether the call function using the cellular network is restricted may include transmitting a registration request signal to a first network, identifying a registration rejection cause when receiving a registration rejection signal from the first network, and identifying, based on the registration rejection cause, that the call function using the cellular network is restricted.

According to an embodiment, the transmitting and/or receiving of the at least one piece of data to and/or from the server may include transmitting information related to origination of a call to the server when receiving an input related to the origination of the call while the function of sharing is activated.

According to an embodiment, the transmitting and/or receiving of the at least one piece of data to and/or from the server may include outputting information related to reception of a call when receiving the information related to the reception of the call from the server while the function of sharing is activated.

According to an embodiment, the transmitting and/or receiving of the at least one piece of data to and/or from the server may include transmitting information related to information related to transmission of a message to the server when receiving an input related to the transmission of the message while the function of sharing is activated.

According to an embodiment, the method may further include restricting origination and/or reception of a call using the cellular network when the function of sharing is activated.

According to an embodiment, the method may further include originating an emergency call through the cellular network when receiving an input related to origination of the emergency call while the function of sharing is activated.

The embodiments of the present disclosure have been shown and described above with reference to the accompanying drawings. The embodiments disclosed in the specification and drawings are only intended to provide specific examples for easily describing the technical content of the disclosure and for assisting understanding of the disclosure, and are not intended to limit the scope of the disclosure. It will be understood by those of ordinary skill in the art that the present disclosure may be easily modified into other detailed forms without changing the technical principle or essential features of the present disclosure, and without departing from the gist of the disclosure as claimed by the appended claims and their equivalents. Therefore, it should be interpreted that the scope of the disclosure includes all changes or modifications derived based on the technical idea of the disclosure in addition to the embodiments disclosed herein.

What is claimed is:

1. An electronic device comprising:

a communication circuit configured to perform communication via a cellular network;

memory storing instructions; and at least one processor operatively connected to the communication circuit and the memory, wherein the instructions, when executed by the at least one processor, cause the electronic device to:

identify whether a call function using the cellular network is restricted, based on identifying that the call function using the cellular network is restricted, activate a function of sharing a call function of an external electronic device, establish communication with a server by transmitting a registration request message including a user account of the electronic device, through the communication circuit, based on activating the function of sharing, and based on detecting an event related to a call performed via the external electronic device, exchange, via the server, at least one piece of data related to the call with the external electronic device to perform the call.

2. The electronic device of claim 1, wherein the instructions, when executed by the at least one processor, cause the electronic device to:

identify function configuration information about the electronic device stored in the memory; and determine that the call function using the cellular network is restricted, based on the function configuration information about the electronic device indicating that the electronic device is configured as a data-centric device.

3. The electronic device of claim 1, wherein the instructions, when executed by the at least one processor, cause the electronic device to:

determine that the call function using the cellular network is restricted based on a SIM (subscriber identity module) card not being inserted into the electronic device.

4. The electronic device of claim 1, wherein the instructions, when executed by the at least one processor, cause the electronic device to:

determine that the call function using the cellular network is restricted based on a profile of an eSIM (embedded subscriber identity module) included in the electronic device being deactivated.

5. The electronic device of claim 1, wherein the instructions, when executed by the at least one processor, cause the electronic device to:

transmit a registration request signal to a first network through the communication circuit;

identify a registration rejection cause based on receiving a registration rejection signal from the first network; and determine, based on the registration rejection cause, that the call function using the cellular network is restricted.

6. The electronic device of claim 1, wherein the instructions, when executed by the at least one processor, cause the electronic device to:

transmit information related to origination of the call to the server, through the communication circuit, based on receiving an input related to the origination of the call while the function of sharing is activated.

7. The electronic device of claim 1, further comprising:

a display, wherein the instructions, when executed by the at least one processor, cause the electronic device to:

display, via the display, information related to reception of the call based on receiving the information related to the reception of the call from the server, through the communication circuit, while the function of sharing is activated.

8. The electronic device of claim 1, wherein the instructions, when executed by the at least one processor, cause the electronic device to:

restrict at least one of origination or reception of a call using the cellular network, based on the function of sharing being activated.

9. The electronic device of claim 1, wherein the instructions, when executed by the at least one processor, cause the electronic device to:

transmit, via the communication circuit, information related to an emergency call based on receiving an input related to origination of the emergency call while the function of sharing is activated.

10. An operating method of an electronic device, the method comprising:

based on a communication circuit configured to perform communication via a cellular network being included in the electronic device, identifying whether a call function using the cellular network is restricted;

based on identifying that the call function using the cellular network is restricted, activating a function of sharing a call function of an external electronic device;

establishing communication with a server by transmitting a registration request message including a user account of the electronic device, based on activating the function of sharing; and based on detecting an event related to a call performed via the external electronic device, exchanging, via the server, at least one piece of data related to the call with the external electronic device to perform the call.

11. The method of claim 10, wherein the identifying whether the call function using the cellular network is restricted comprises:

determining that the call function using the cellular network is restricted based on function configuration information about the electronic device indicating that the electronic device is configured as a data-centric device based on a SIM (subscriber identity module) card not being inserted into the electronic device, or based on a profile of an eSIM (embedded subscriber identity module) included in the electronic device being deactivated.

12. The method of claim 10, wherein the identifying whether the call function using the cellular network is restricted comprises:

transmitting a registration request signal to a first network;

identifying a registration rejection cause based on receiving a registration rejection signal from the first network; and identifying, based on the registration rejection cause, that the call function using the cellular network is restricted.

13. The method of claim 10, wherein the exchanging the at least one piece of data with the external electronic device comprises:

transmitting at least one of information related to origination of the call or information related to transmission of a message, based on receiving an input related to at least one of the origination of the call or the transmission of the message while the function of sharing is activated.

14. The method of claim 10, wherein the exchanging the at least one piece of data with the external electronic device comprises:

outputting at least one of information related to reception of the call or information related to reception of a message based on receiving the information related to at least one of the reception of the call or the reception of the message from the server while the function of sharing is activated.

15. The method of claim 10, further comprising:

restricting at least one of origination or reception of a call using the cellular network based on the function of sharing being activated.

16. The method of claim 10, further comprising:

transmitting information related to an emergency call through the cellular network based on receiving an input related to origination of the emergency call while the function of sharing is activated.

17. A non-transitory computer readable medium for storing computer readable program code or instructions which are executable by a processor to perform a method of an electronic device, the method comprising:

based on a communication circuit configured to perform communication via a cellular network being included in the electronic device, identifying whether a call function using the cellular network is restricted;

based on identifying that the call function using the cellular network is restricted, activating a function of sharing a call function of an external electronic device;

establishing communication with a server by transmitting a registration request message including information related to a user account of the electronic device, based on activating the function of sharing; and based on detecting an event related to a call performed via the external electronic device, exchanging, via the server, at least one piece of data related to the call with the external electronic device to perform the call.

18. The non-transitory computer readable medium of claim 17, wherein the identifying whether the call function using the cellular network is restricted comprises:

transmitting a registration request signal to a first network;

identifying a registration rejection cause based on receiving a registration rejection signal from the first network; and identifying, based on the registration rejection cause, that the call function using the cellular network is restricted.

19. The non-transitory computer readable medium of claim 17, wherein the exchanging the at least one piece of data with the external electronic device comprises:

transmitting at least one of information related to origination of a call or information related to transmission of a message, based on receiving an input related to at least one of the origination of the call or the transmission of the message while the function of sharing is activated.

20. The non-transitory computer readable medium of claim 17, wherein the exchanging the at least one piece of data with the external electronic device comprises:

outputting at least one of information related to reception of the call or information related to reception of a message based on receiving the information related to at least one of the reception of the call or the reception of the message from the server while the function of sharing is activated.

* * * * *